United States Patent
Nair et al.

(10) Patent No.: US 10,324,606 B1
(45) Date of Patent: *Jun. 18, 2019

(54) DYNAMIC PRESENTATION OF USER ACCOUNT INFORMATION FOR A SOCIAL NETWORK

(71) Applicant: Microsoft Technology Licensing, LLC, Redmond, WA (US)

(72) Inventors: Viji Nair, Bangalore (IN); Basil Kurian, Bangalore (IN); Theodore Hwa, Cupertino, CA (US); Karrick McDermott, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/841,425

(22) Filed: Aug. 31, 2015

(51) Int. Cl.
*G06F 3/0484* (2013.01)
*H04L 12/24* (2006.01)
*H04L 29/12* (2006.01)
*H04L 29/08* (2006.01)
*H04L 29/06* (2006.01)

(52) U.S. Cl.
CPC .......... *G06F 3/04847* (2013.01); *H04L 41/22* (2013.01); *H04L 61/6068* (2013.01); *H04L 63/10* (2013.01); *H04L 67/02* (2013.01); *H04L 67/146* (2013.01); *H04L 67/22* (2013.01)

(58) Field of Classification Search
CPC ......... H04L 41/22; H04L 67/22; H04L 67/02; H04L 67/146; H04L 63/10; H04L 61/6068; G06F 3/04847
See application file for complete search history.

(56) References Cited

U.S. PATENT DOCUMENTS

| | | | |
|---|---|---|---|
| 9,503,413 B2 | 11/2016 | Sayed | |
| 9,564,025 B1* | 2/2017 | Nielsen | G06Q 10/06 |
| 9,578,602 B1 | 2/2017 | Acharya | |
| 2009/0216569 A1* | 8/2009 | Bonev | G06F 17/30029 705/5 |
| 2012/0297484 A1 | 11/2012 | Srivastava | |
| 2013/0132195 A1 | 5/2013 | Klish | |
| 2013/0185230 A1* | 7/2013 | Zhu | G06Q 10/107 706/12 |
| 2014/0330818 A1 | 11/2014 | Raina | |
| 2015/0007267 A1* | 1/2015 | Junod | H04L 63/08 726/3 |
| 2015/0082384 A1 | 3/2015 | St. Clair | |

(Continued)

OTHER PUBLICATIONS

Elad, "LinkedIn for Dummies", (Feb. 3, 2014), for Dummies, 3rd Edition, p. 1-13.*

(Continued)

*Primary Examiner* — Ajay M Bhatia
*Assistant Examiner* — Mong-Shune Chung
(74) *Attorney, Agent, or Firm* — Hickman Palemo Becker Bingham LLP

(57) ABSTRACT

In an embodiment, a method and system for responding to receipt of an Internet Protocol (IP) address associated with accessing an online social network is disclosed herein. One or more user accounts in the online social network associated with the IP address are identified. A plurality of interactive graphical elements that depict dynamically visualized information about the one or more user accounts are provided.

19 Claims, 25 Drawing Sheets

(56) References Cited

U.S. PATENT DOCUMENTS

| | | |
|---|---|---|
| 2015/0149649 A1 | 5/2015 | Hughes |
| 2015/0215374 A1* | 7/2015 | Hundt ..................... H04L 67/34 709/219 |
| 2016/0173540 A1 | 6/2016 | Linden |
| 2016/0307191 A1* | 10/2016 | Turgeman ............ G06Q 20/382 |
| 2017/0111364 A1 | 4/2017 | Rawat |
| 2017/0140285 A1 | 5/2017 | Dotan-Cohen |

OTHER PUBLICATIONS

Nair, U.S. Appl. No. 14/988,681, filed Jan. 5, 2016, Office Action, dated Oct. 3, 2017.
Nair, U.S. Appl. No. 14/841,451, filed Aug. 31, 2015, Notice of Allowance, dated Jun. 27, 2017.
Nair, U.S. Appl. No. 14/841,451, filed Aug. 31, 2015, Office Action, dated Dec. 23, 2016.

* cited by examiner

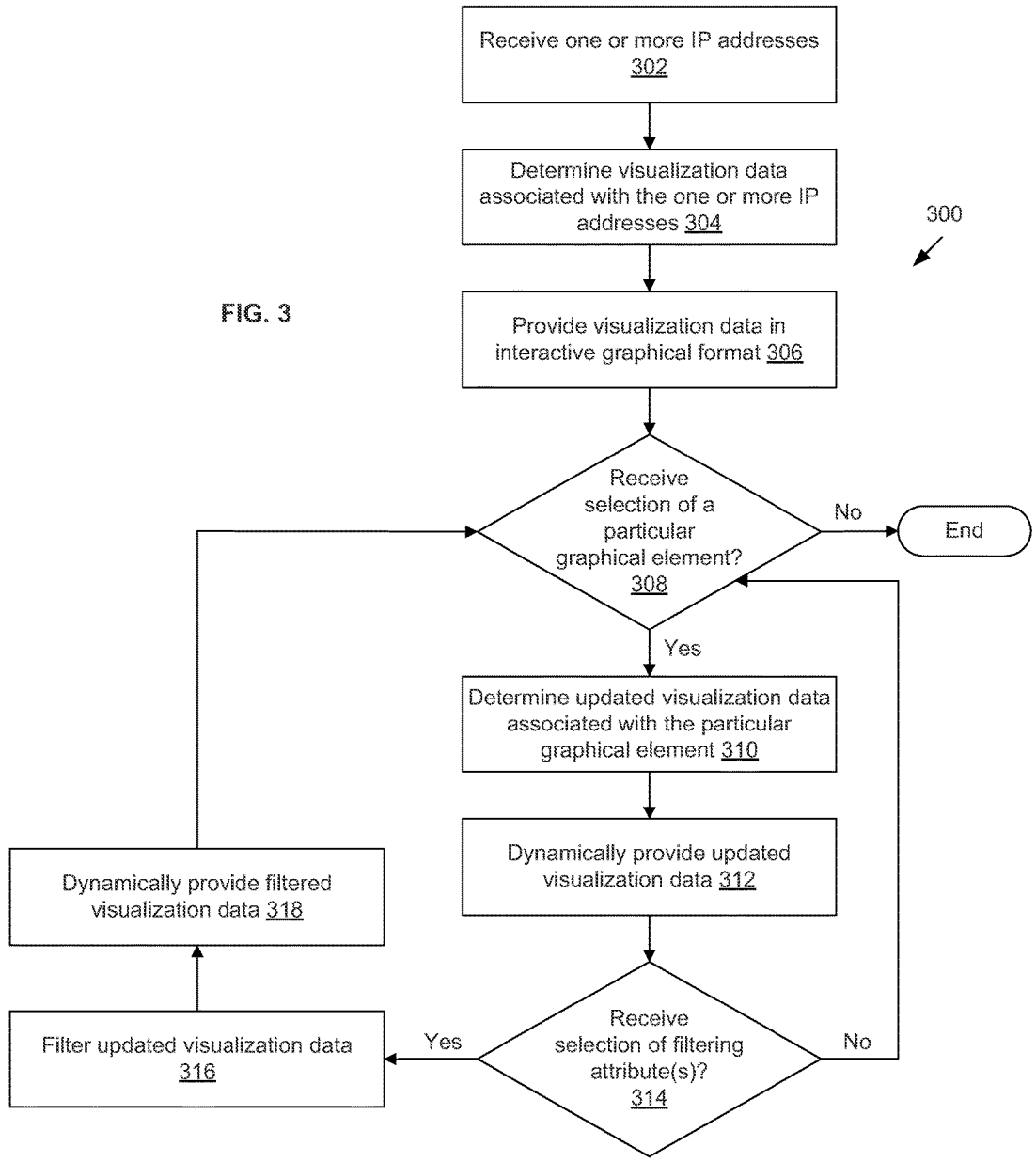

DYNAMIC PRESENTATION OF USER ACCOUNT INFORMATION FOR A SOCIAL NETWORK

FIELD OF THE DISCLOSURE

The present disclosure relates to online network security, and in particular, to maintaining security of online social networks.

BACKGROUND

Online social networks facilitate sharing of information and interaction among users of the social network. Users typically register with the social network in order for their respective information, interests, preferences, and other associated data to persist over successive sessions. Although the vast majority of users engage in authorized activity on the network, unfortunately there is a subset of users that may engage in unauthorized activity that is adverse to other users and/or the social network at large. Examples of unauthorized activity include spamming one or more other users or scrapping information about one or more other users from the social network platform.

Such users often proactively attempt to obfuscate their unauthorized activity. Thus, it may not be straightforward to detect such activity and/or who the users are that are responsible. Furthermore, when a social network has millions or hundreds of millions of registered users, the amount of activity generated by the registered users on the social network platform at any given time is of such a scale that maintaining a safe network without unduly restricting users or activities is difficult.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 illustrates an example flow for providing information in response to an IP address query, according to some embodiments.

DETAILED DESCRIPTION

Figure 1:
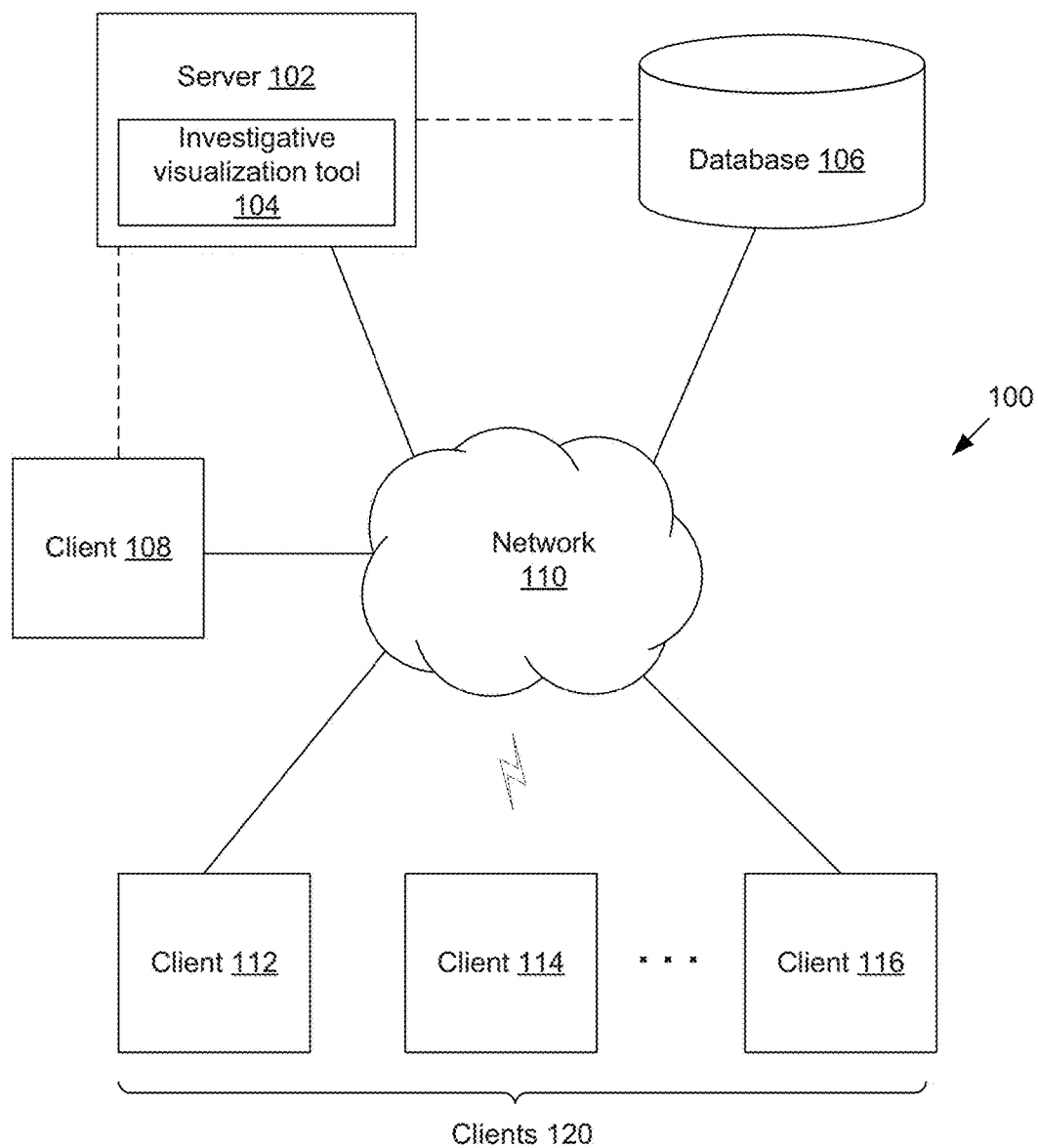
FIG. 1 depicts an example system for providing query results in a dynamic and interactive graphical format in response to an IP address or member identifier query, according to some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present disclosure.

Various modifications to the embodiments will be readily apparent to those skilled in the art, and principles defined herein may be applied to other embodiments and applications without departing from the spirit and scope of the invention. Moreover, in the following description, numerous details are set forth for the purpose of explanation. However, one of ordinary skill in the art will realize that embodiments may be practiced without the use of these specific details. In other instances, well-known structures and processes are not shown in block diagram form in order not to obscure the description of embodiments with unnecessary detail. Thus, the present disclosure is not intended to be limited to the embodiments shown, but is to be accorded the widest scope consistent with the principles and features disclosed herein.

General Overview

In an embodiment, a programmatic method enables querying an Internet Protocol (IP) address or member user identifier associated with an online social network. In response to the query, dynamic and interactive graphical query results are provided to facilitate analysis of a variety of information about the queried IP address or member user identifier for customer support and/or security purposes. In an embodiment, query results corresponding to a queried IP address includes information about the IP address and/or one or more user accounts associated with the IP address. The provided information includes, but is not limited to, one, two, or more of: one or more user account identifiers, one or more electronic mail addresses associated with a user account, a user account activity status, a user account restriction status, an IP address associated with user account registration, a time date stamp associated with the user account registration, a connections count, a geographical location associated with the user account registration, a count of user accounts associated with the IP address, a count of restricted status user accounts associated with the IP address, a count of blocked events, partner (or third party) associated with the IP address, geographical location information about a partner, an organization or entity associated the IP address, a service provider associated with the IP address, or an ASN associated with the IP address.

In an embodiment, query results corresponding to a queried member user identifier includes information about a user account associated with the member user identifier and/or one or more user accounts deemed to be connected to the queried member user identifier based on a same web browser identifier. The provided information includes, but is not limited to, one, two, or more of: connection information between the user account corresponding to the member user identifier and each of the connected user accounts, user account information associated with the member user identifier, user account information associated with each of the connected user accounts, account restriction status information, account creation information, account access geographical information, account content accessed history information, account identifier, account contact information, or additional information about a particular attribute of the user account associated with the member user identifier (e.g., page views, summary of page views, first degree connections).

The programmatic method further enables filtering the displayed data set via interaction with interactive graphical filtering elements, and dynamically updating the displayed data set in accordance with the specified filtering parameters. A user may also initiate display of additional information about an IP address, one or more user accounts, and/or a particular attribute of one or more user accounts from within the currently displayed interactive graphical query results. The displayed interactive graphical query results simultaneously presents information in multiple graphical formats (e.g., tables, connection graphs, pie charts, bar graphs, scatter plots, and the like) as well as enable user interaction with the query results by dynamically updating the query results in accordance with data manipulation requests made by the user.

In this manner, techniques to facilitate comprehensive and easy visualization of information associated with an IP address or member user identifier of interest are disclosed herein. Not only is a wealth of information presented to the user in a user-friendly format, the presentation format also enables easy navigation within the available data set to support individualized analysis of user accounts. These and other details regarding an investigative visualization tool are discussed in detail below.

Example Computer System Implementation

FIG. 1 depicts an example computer-based system 100 in which the techniques described may be practiced, according to some embodiments. The various components of system 100 are implemented at least partially by hardware at one or more computing devices, such as one or more hardware processors executing instructions stored in one or more memories for performing various functions described herein. System 100 illustrates only one of many possible arrangements of components to perform the functionality described herein. Other arrangements may include fewer or different components, and the division of work between the components may vary depending on the arrangement.

System 100 includes a server 102, a database 106, a client 108, a network 110, and one or more clients 112, 114, and 116. Each of the server 102, database 106, and clients 108, 112, 114, 116 is in wired or wireless communication with the network 110.

Server 102 comprises one or more servers, computers, processors, webpage servers, database servers, and/or computing devices to communicate with the database 106 and/or clients 108, 112, 114, or 116 via network 110. Server 102 hosts one or more applications, websites, social networks, and/or other visual or user interface mechanisms related to techniques and data described in detail below. Server 102 can also include an investigative visualization tool 104 as described in detail below. Server 102 may be located at one or more geographically distributed locations. Although one server 102 is shown in FIG. 1, system 100 may, depending on the embodiment, comprise one, two, or any number of servers 102, which may work alone and/or collectively to provide the functionality described herein.

Database 106 comprises one or more databases, data stores, or storage devices to store and maintain user profiles, data associated with user profiles, data associated with use of or access to user profiles, data derived from user profiles, and/or instructions for use by server 102 and/or clients 108, 112, 114, or 116 as described herein. Database 106 may, in some embodiments, be located at one or more geographically distributed locations relative to server 102. Server 102 and/or clients 108, 112, 114, or 116 may, in some embodiments, access database 106 via network 110. Alternatively, server 102 may access database 106 without use of network 110. As another alternative, database 106 may be included within server 102. System 100 may, depending on the embodiment, comprise one, two, or any number of databases 106 to individually and/or collectively store the data described herein.

Clients 108, 112, 114, and 116 comprise computing devices, including but not limited to, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the clients 108, 112, 114, and 116 includes applications, software, and/or other executable instructions to facilitate various aspects of the techniques described herein. Clients 108, 112, 114, and 116 may also include additional applications or other interface capabilities to communicate with the server 102 and/or database 106. Clients 108, 112, 114, and 116 may, depending on the embodiment, be located geographically dispersed from each other, server 102, and/or database 106.

In an embodiment, client 108 may be used by an administrator user, investigative team user, security team user, customer support team user, or other personnel authorized by an online social network to access the investigative visualization tool 104. The investigative visualization tool 104 is accessed from server 102 via network 110 and/or without use of network 110. Although a single client 108 is shown in FIG. 1, more or less than a single client 108 may be included in system 100.

In an embodiment, clients 112, 114, and 116, collectively referred to as clients 120, may be used by members of an online social network (e.g., registered users or members) to login and conduct activity on the online social network. Each of the registered users or members may be identifiable by a unique member identifier (also referred to as a member ID, MID, or user identifier) on the online social network. Each member identifier has associated therewith a user profile or account (and associated activity) corresponding to a registered user/member. Although three clients 112, 114, and 116 are shown in FIG. 1, more or less than three clients 112, 114, and 116 may be included in system 100. In some embodiment, a particular registered user may use more than one of clients 120 (e.g., use client 112 and client 114) to access the online social network.

Network 110 comprises a communications network, such as a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network, or a combination of two or more such networks. When network 110 comprises a public network, security features (e.g., VPN/SSL secure transport) may be included to ensure authorized access within system 100.

Figure 2:
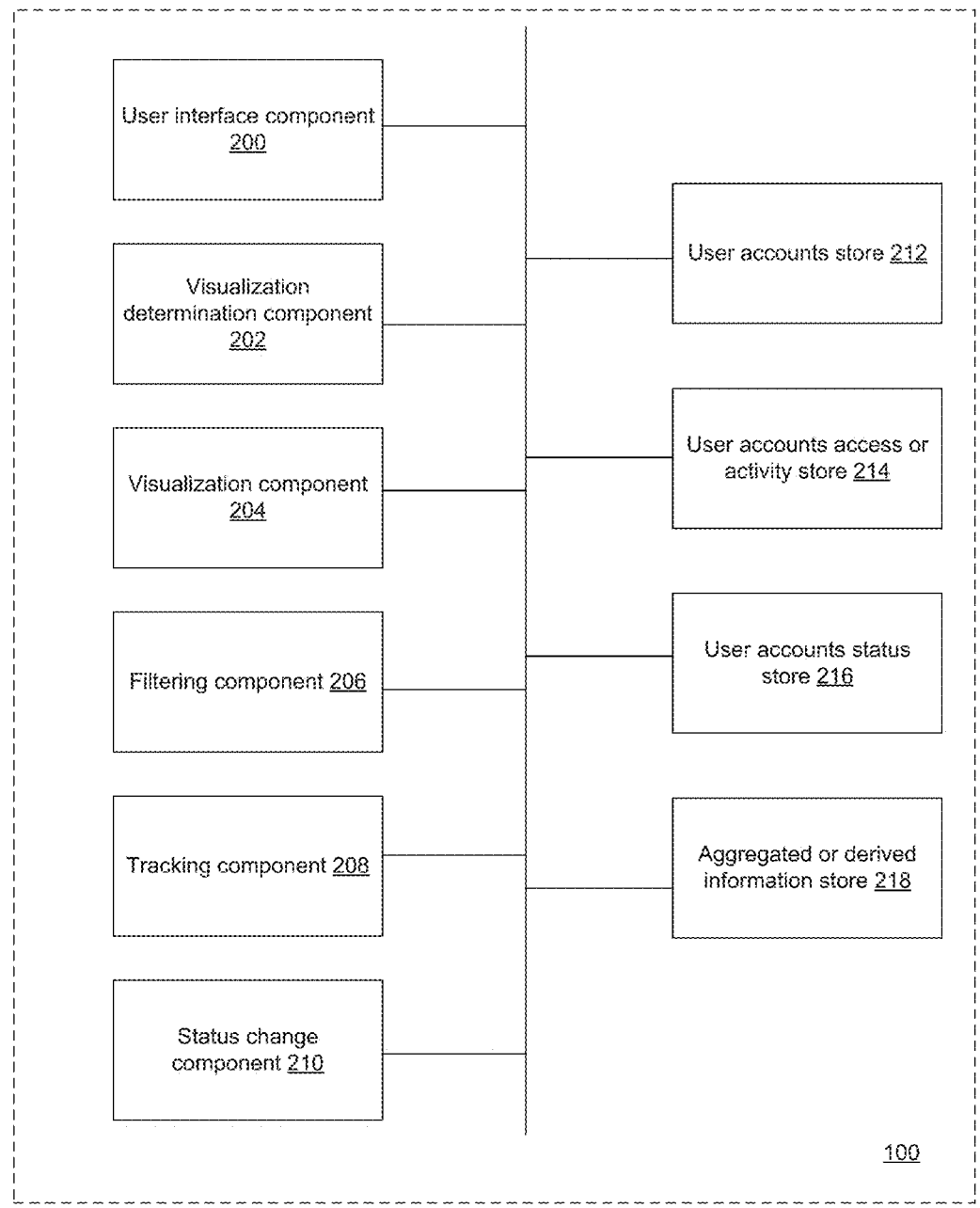
FIG. 2 illustrates example components and data included in the system of FIG. 1, according to some embodiments.

FIG. 2 depicts example components and data that may be included in system 100 to determine and provide dynamic visualization of user account information and user account associated information in response to a particular input information, according to some embodiments. The various components and/or data of system 100 are implemented at least partially by hardware at one or more computing devices, such as one or more hardware processors executing instructions stored in one or more memories for performing various functions described herein. The components and/or data are communicatively coupled (e.g., via appropriate interfaces) to each other and to various data sources, so as to allow information to be passed between the components and/or to share and access common data. FIG. 2 illustrates only one of many possible arrangements of components and data to perform the functionality described herein. Other arrangements may include fewer or different components and/or data, and the division of work between the components and/or data may vary depending on the arrangement.

In an embodiment, system 100 includes a user interface component 200, a visualization determination component 202, a visualization component 204, a filtering component 206, a tracking component 208, and a status change component 210. Components 200-210 can comprise the investigative visualization tool 104 included in the server 102. In other embodiments, one or more of components 200-210 may be included in the server 102 or database 106, and others of the components 200-210 may be included in the client 108. For example, user interface component 200 or visualization component 204 may be included in the client 108 while the remaining components reside in the server 102.

In an embodiment, system 100 further includes data such as, but not limited to, a user accounts store 212, a user accounts access or activity store 214, a user accounts status store 216, and an aggregated or derived user information store 218. Stores 212-218 can be included in the database 106.

As discussed in greater detail below, the user interface component 200 provides user interface functionalities to users interfacing with client 108 to enable and receive input of particular data (e.g., member ID or IP address) from a user, trigger determination of visualization data that is responsive to the inputted data, facilitate particular visualization of the visualization data, and the like. The visualization determination component 202 determines what data to provide to the user in response to the inputted particular data, what data source(s) to access to obtain such data, whether data processing is required to generate the visualization data, and performs associated functionalities to result in the desired output data for the inputted particular data. Visualization data, or precursors to such data, is obtained from one or more of stores 212-218.

User accounts store 212 comprises multiple user account records, each user account record corresponding to a particular registered user or member of an online social network. Each user account record includes information about a registered user such as, but not limited to, first name, last name, contact electronic mail (email) address, account opening statistics (e.g., time and date stamp of when the account was opened, IP address used to open the account, geographical location from which the account was opened, etc.), image or photograph, user profile information (e.g., education, employment, licensures, professional affiliations, etc.), an account identifier, and the like. User accounts may also be referred to as member records, member accounts, or the like. User accounts access or activity store 214 comprises information about online social network access or activity associated with each of the user accounts specified in the user accounts store 212. Access or activity information includes, but is not limited to, time and date stamp of each access, geographical location of each access, IP address associated with each access, a browser identifier associated with each access, which online social network pages were accessed, history of changes made to user account information (e.g., email address changes), and the like.

User accounts status store 216 comprises an account status indicator for each user account such as, but not limited to, normal, blocked or restricted, or closed. Historical information about changes to the account status indicator over time may also be included. For example, a particular user account may have started as a normal account, then changed to a restricted account at a certain time, and then changed again to a normal account at a later point in time. Aggregated or derived user information store 218 comprises information associated with user accounts or IP addresses that may be aggregated, collated, derived, and/or in addition to information in any of stores 212-216. In some embodiments, some of the information included in the store 218 may be duplicative of information included in one or more of stores 212-216. For instance, information that is often accessed may be arranged together in tables or data structures for easier or faster access. As another example, IP addresses associated with partners of the online social network and information about the partners can be included in store 218. In some embodiments, new information that is generated as part of the visualization data may be stored in the aggregated or derived user information store 218 for future use.

Visualization component 204 in connection with the visualization determination component 202 uses one or more style sheets, templates, or other pre-defined display requirements to appropriately format the visualization data determined by the visualization determination component 202. Visualization component 204 coordinates with the user interface component 200 to present the visualization data that is appropriately formatted to the user at the client 108.

When the user interfaces with the presented visualization data at the client 108, such as selecting one or more attributes on which to filter the displayed data set, filtering component 206 filters the displayed data set in accordance with the selected attribute(s). Visualization component 204 dynamically updates the visualization data to reflect the filtering performed by the filtering component 206. As another example, when the user interfaces with one or more displayed elements to initiate or request certain additional information (e.g., click on a link to obtain additional information about a particular user account), visualization determination component 202 in conjunction with visualization component 204 determines, accesses, formats, and presents the additional information.

In some embodiments, user interface component 200 provides an option to track a particular user account, IP address, activity, or likewise a condition. Tracking component 208 tracks for such condition, and if the condition occurs, provides an automatic notification that the condition occurred. User interface component 200 in conjunction with the status change component 210 may also provide an option for the user to change the status of one or more user accounts or IP addresses. For example, a particular user account suspected of unauthorized activity may be confirmed to be an account responsible for unauthorized activity based on the visualization data. Accordingly, the user changes the account status associated with the particular user account to a restricted status or closed status via the status change component 210. The account status is appropriately updated in the user accounts status store 216.

In one embodiment, components 200-210 comprise one or more software components, programs, applications, or other units of code base or instructions to be executed by one or more processors included in the server 102 and/or a client 108. Although components 200-210 are depicted as distinct components in FIG. 2, components 200-210 may be implemented as fewer or more components than illustrated. Data stores 212-218 may be implemented as fewer or more data stores than illustrated. Data stores 212-218 may be organized in particular data structures, data tables, data spreadsheets, relational data scheme, and the like. Any of components 200-210 or data stores 212-218 may communicate with one or more devices included in the system 100, such as server 102, database 106, or client 108.

Example Functional Implementation

IP Address Use Case

FIG. 3 depicts an example flow 300 of the investigative visualization tool 104 that is responsive to receiving one or more IP addresses as the input or query, according to some embodiments. FIGS. 4A-4E depict example screens or screenshots of information presented by the investigative visualization tool 104 in connection with the received one or more IP addresses, according to some embodiments. FIG. 3 is described in detail below in conjunction with the components and data of FIG. 2 and the screenshots of FIGS. 4A-4E. In an embodiment, each of the processes described in connection with the functional blocks of FIG. 3 may be implemented using one or more computer programs, other software elements, and/or digital logic in any of a general-purpose computer or a special-purpose computer, while performing data retrieval, transformation and storage operations that involve interacting with and transforming the physical state of memory of the computer. Flow 300 depicts example techniques accessed by a specific user, such as an administrator, customer support personnel, or security team personnel of the online social network. The process of flow 300 can be repeated for each of multiple of such users at different points in time.

In block 302, the user interface component 200 receives an input or query from a user at the client 108. The input or query comprises one or more IP addresses and, optionally, additional input or constraint, such as a date range, type of user account (e.g., all accounts or blocked accounts only), type of event (e.g., blocked events or API events), or other constraint. In response to the received input or query (one or more IP addresses and possible additional input), the visualization determination component 202 determines or identifies visualization data associated with the received input or query in block 304. Visualization determination component 202 accesses and/or generates the visualization data using one or more of stores 212-218. Visualization data comprises the output or query result corresponding to the received input or query. Visualization data may also be referred to as visualization data set, displayed data set, or query results.

The visualization data comprises information about the user accounts associated with the received IP address (and additional input, if specified) and information about the received IP address. In an embodiment, the visualization data includes, but is not limited to, one or more of the following: a count of all the user accounts associated with the received IP address, a count of all the restricted user accounts from among all the user accounts associated with the received IP address, a count of blocked events associated with the received IP address (e.g., events associated with temporary or permanent blocking of access, such as, exceeding daily page view limits, requests from blacklisted Internet Service Providers (ISPs) and/or countries, invalid/incorrect requests above a threshold, etc.), whether or not the received IP address belongs to a partner (e.g., third party websites, blogs, or the like from which users can log into the online social network), geographical information associated with the received IP address (e.g., city, region, country), organization or entity associated with the received IP address (e.g., organization or entity name), service provider associated with the received IP address (e.g., ISP name), and Autonomous System Number (ASN) associated with the received IP address.

Next in block 306, visualization determination component 202 in conjunction with the visualization component 204 configures and provides the visualization data for display on the client 108. In an embodiment, the visualization data is displayed in an interactive graphical format, comprising multiple graphical or visual elements, of which one or more of the elements may be user interactive (e.g., links, buttons, "active" icons, radio buttons, checkboxes, dropdown box, or the like).

Figure 4A:
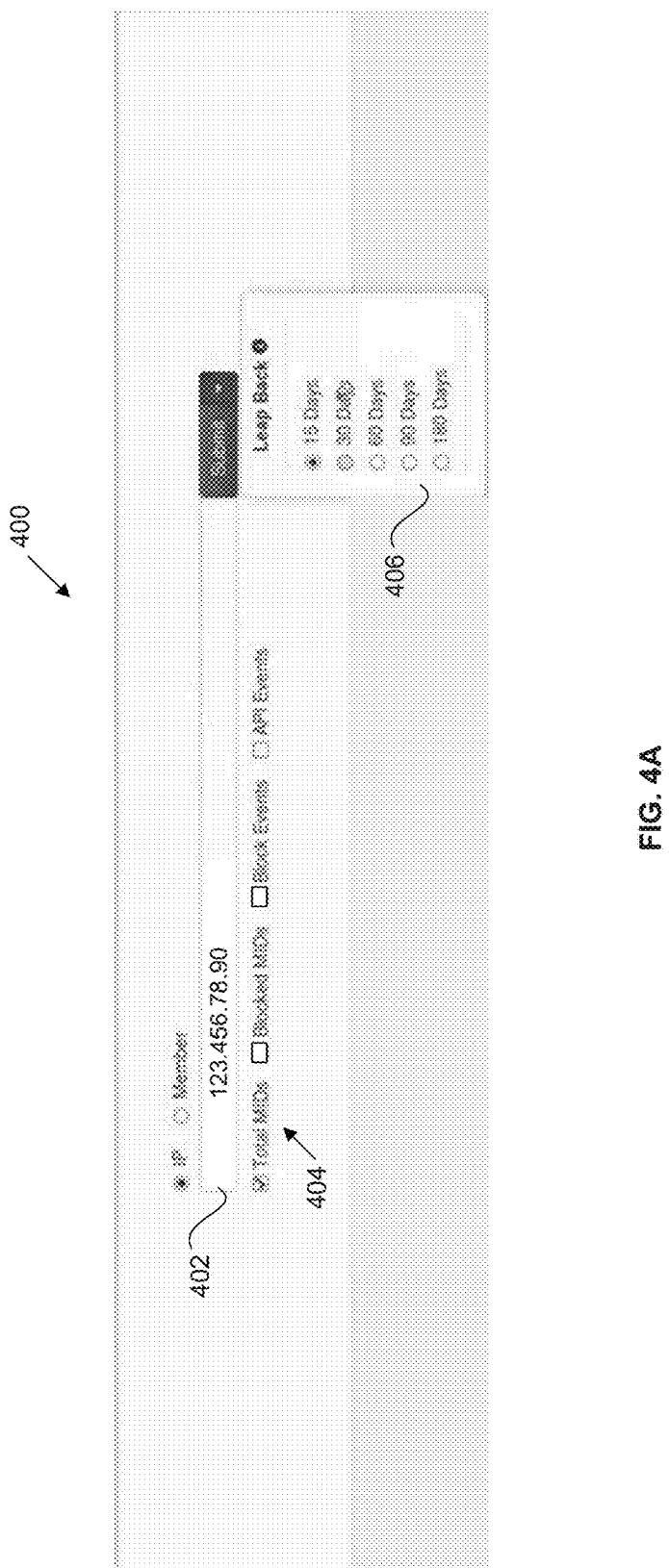
FIGS. 4A-4I illustrate example screens or screenshots of information presented in connection with the received one or more IP addresses, according to some embodiments.

FIG. 4A depicts an example screen or screenshot 400 including an IP address input field 402, multiple additional input icons 404 ("Total MIDs," "Blocked MIDs," "Block Events," and "API Events"), and a date range drop down box 406 ("15 days," "30 days," "60 days," "90 days," and "180 days"). Selection from among the multiple additional input icons 404 and the data range drop down box 406 is optional. In screen 400, an IP address "123.456.78.90" is shown entered into the input field 402, a "Total MIDs" box of the multiple additional input icons 404 is checked, and the last 15 days is selected from within the drop down box 406. The "Total MIDs" box represents a request to include information about all of the user accounts associated with the inputted IP address in the query results, as opposed to the "Blocked MIDs" box, when checked, includes only user accounts associated with the inputted IP address that currently have a blocked account status in the query results.

Note that terms such as "member identifier," "member ID," "MID," "member number," "identifier of a member," "member user identifier," "user account," "account number," "account identifier," and the like may be used interchangeably herein to denote a unique record or identifier associated with a registration with the online social network and in which the same registration is subsequently (or repeatedly) referenced by logging into the online social network using unique information associated with the registration. For example, a unique username and password may be established at registration by a user and used by the user for subsequent access or activity on the online social network.

Figure 4B:
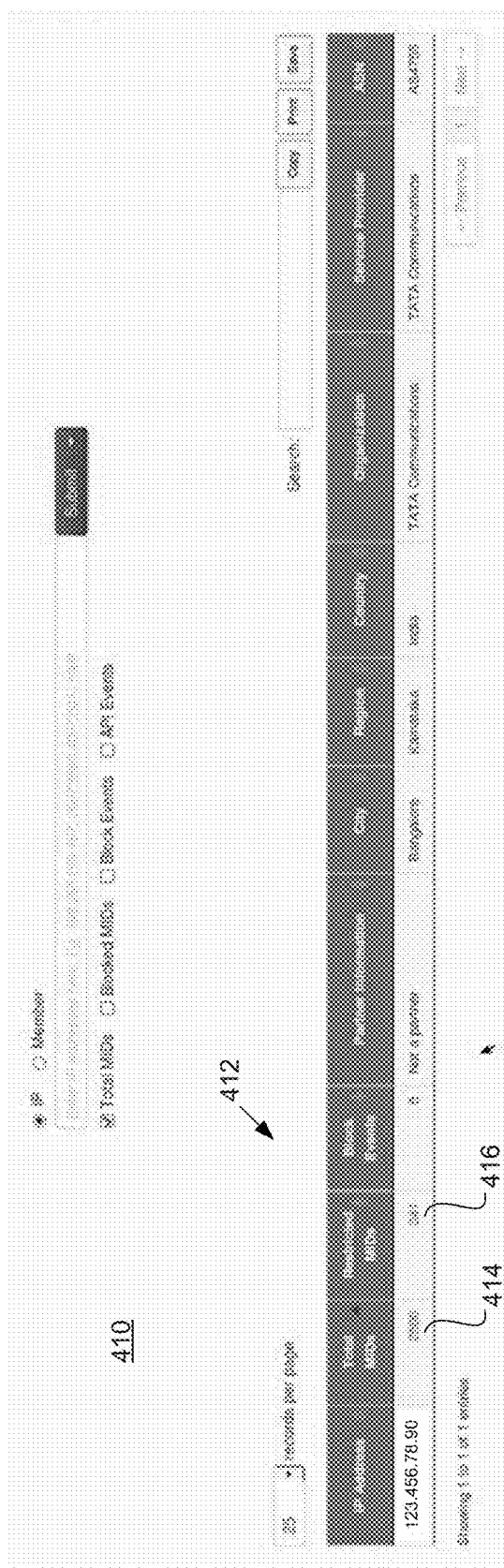

FIG. 4B depicts an example screen or screenshot 410 showing visualization data 412 that is returned in response to the IP address and additional inputs provided in FIG. 4A. As shown in FIG. 4B, visualization data 412 is presented in a table, visualization data 412 including: IP address (e.g., 123.456.78.90), Total MIDs count (e.g., 2800),
    Restricted MIDs count (e.g., 341),
    Block Events count (e.g., 0).
    Partner Information—partner name, if a partner, or indication that the IP address does not belong to a partner (e.g., Not a partner), City, Region, and Country—geographical information corresponding to the IP address (e.g., Bangalore, Kamataka, India), Organization name (e.g., TATA Communications), Service Provider name (e.g., TATA Communications), ASN (e.g., AS4755).

As shown in FIG. 4B, when employers of an organization or entity access the online social network via, for example, the same organization/entity gateway, those employers' user accounts will be associated with the IP address of the organization/entity gateway. Visualization data 412 includes one or more user interactive elements. In screen 410, the total MIDs count is also a link 414 and the restricted MIDs count is also a link 416.

Returning to FIG. 3, at a yes branch of block 308, user interface component 200 receives user selection of a particular interactive graphical element from among the presented visualization data in block 306. For example, link 416 corresponding to restricted user accounts in FIG. 4B may be actuated by the user to obtain additional information about the 341 restricted user accounts associated with the received IP address. If the user makes no selection, then the flow 300 ends at a no branch of block 308.

In response to user selection of a particular interactive graphical element, visualization determination component 202 interfaces with one or more of stores 212-218 to determine updated visualization data associated with the user selection in block 310. Continuing the example, if link 416 corresponding to restricted user accounts in FIG. 4B is selected, then visualization determination component 202 determines and collates information about each of the user accounts, corresponding to the received IP address, that currently has a restricted status. Likewise, if link 414 corresponding to total user accounts in FIG. 4B is selected, then visualization determination component 202 determines and collates information about each of the user accounts corresponding to the received IP address.

In block 312, visualization component 204 dynamically updates the visualization data to provide the updated visualization data. In an embodiment, the updated visualization data is presented as multiple graphical or visual elements, one or more of which are interactive or "active" elements. The updated visualization data can be presented in one or more sections, pages, or different types of graphical or visual formats (e.g., tables, pie charts, bar graphs, connection graphs, scatter plots, and the like).

In an embodiment, the updated visualization data includes, but is not limited to, one or more of the following:

Aggregated information about user accounts associated with the received IP address, IP address information, Individualized information about each of the user accounts selected by the user (e.g., total MIDs or restricted MIDs). For each of the respective user accounts, one, two or more of the following information can be provided: one or more user account identifiers, one or more electronic mail addresses associated with a user account, a user account activity status, a user account restriction status, an IP address associated with the user account registration, a time date stamp associated with the user account registration, a connections count, or a geographical location associated with the user account registration, One or more data attributes to filter the individualized information about the user accounts.

Figure 4C:
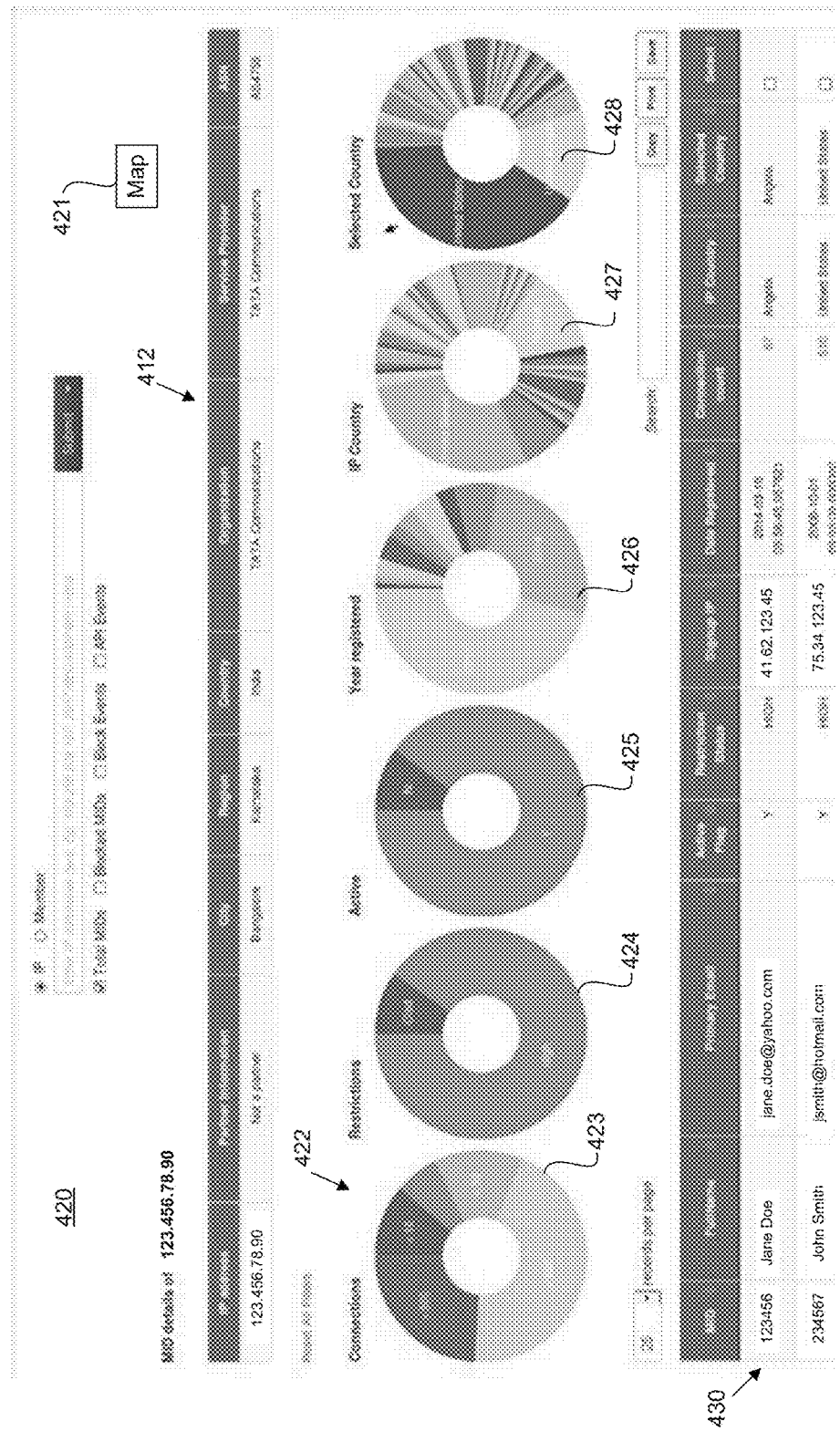

FIG. 4C depicts an example screen or screenshot 420 showing updated visualization data in response to user selection of restricted user accounts (link 416 in FIG. 4B). Screen 420 includes the visualization data 412, a map icon 421, a plurality of filtering elements 422, and individualized information about each of the restricted user accounts 430. The plurality of filtering elements 422 is depicted as a plurality of interactive pie charts, in which each section of each of the pie charts is a data attribute on which the user account data set of the individualized information about each of the restricted user accounts 430 can be filtered. One or more of the pie chart sections can be selected to filter on respective one or more of the selected filtering attributes. The plurality of filtering elements 422 comprises one or more of: a connections count filtering element 423, a type of restrictions filtering element 424, active or inactive status of the user account filtering element 425, a registration year of the user account filtering element 426, a country of the IP address used to register the user account filtering element 427, and a selected country of the user account filtering element 428.

In an embodiment, the individualized information about each of the restricted user accounts 430 is depicted in table format. As shown in screen 420, for each relevant user account, the following information is displayed: a MID, member user's full name, member user's primary email address, whether the user account is active or inactive, user account's restriction status (e.g., high, restricted, or blocked; closed; or normal), IP address used to register or sign up the user account, time date stamp on which the user account was registered or signed up, a connections counts (e.g., first degree connections to other member users), the country associated with the sign up IP address, a member user designated country for user account access, and interactive element (checkbox) to select a particular user account for further action. Although not shown in FIG. 4C, the table of user account information 430 includes a row for each of the 341 restricted user accounts associated with the received IP address.

Returning to FIG. 3, at a yes branch of block 314, the user interface component 200 receives user selection of one or more filtering elements to filter the user account data set included in the updated visualization data. In response, the filtering component 206 performs filtering operations to filter at least the user account data set included in the updated visualization data in accordance with the user selected filtering element(s) in block 316. And in block 318, the visualization component 204 dynamically updates the presentation to provide filtered visualization data. Next, flow 300 returns to block 308 for next user input. If no filtering element is selected (i.e., no branch of block 314), then flow 300 proceeds to block 308 to await selection of a particular graphical element within the updated visualization data. For example, the user may select a particular user account within the table of user account information 430 in FIG. 4C to obtain more information about the particular user account. Additional details about this aspect are provided below with respect to FIG. 5.

Figure 4D:
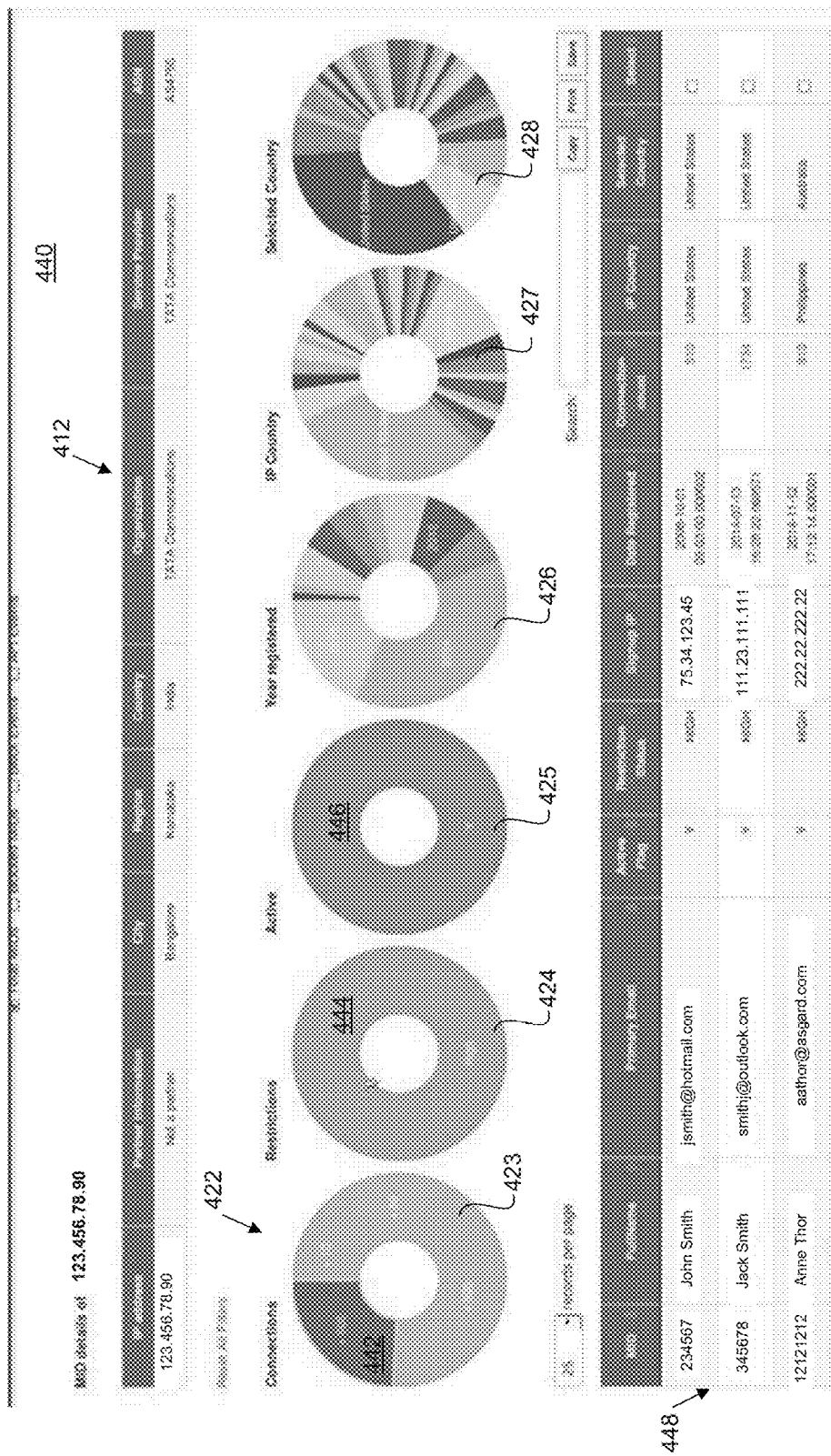

Continuing the screenshot example, FIG. 4D depicts an example screen or screenshot 440 showing the user account information 430 (of FIG. 4C) dynamically updated to user account information 448 in response to selection of one or more filtering elements from the plurality of filtering elements 422. In screen 440, the user has selected a ">500" connections count filtering element 442, a "high" restriction status filtering element 444, and a "y" or yes active account filtering element 446 to filter the original user account data set in user account information 430 on a combination of three data attributes. Accordingly, as shown in user account information 448, only a subset of the user account rows are presented relative to those of user account information 430. In particular, only those user accounts that have more than 500 connections, a "high" restriction account status, and whose account is currently active remain.

In an embodiment, as each filtering element is selected by the user, the corresponding pie chart is dynamically updated to show the selection and the user account information table below the pie charts is also dynamically updated in accordance with the selected filtering element. The user accounts may be filtered based on more or less than three different attributes. The filter conditions may also be removed ("Reset all filters") to return the plurality of filtering elements 422 and user account information to those shown in FIG. 4C.

Figure 4E:
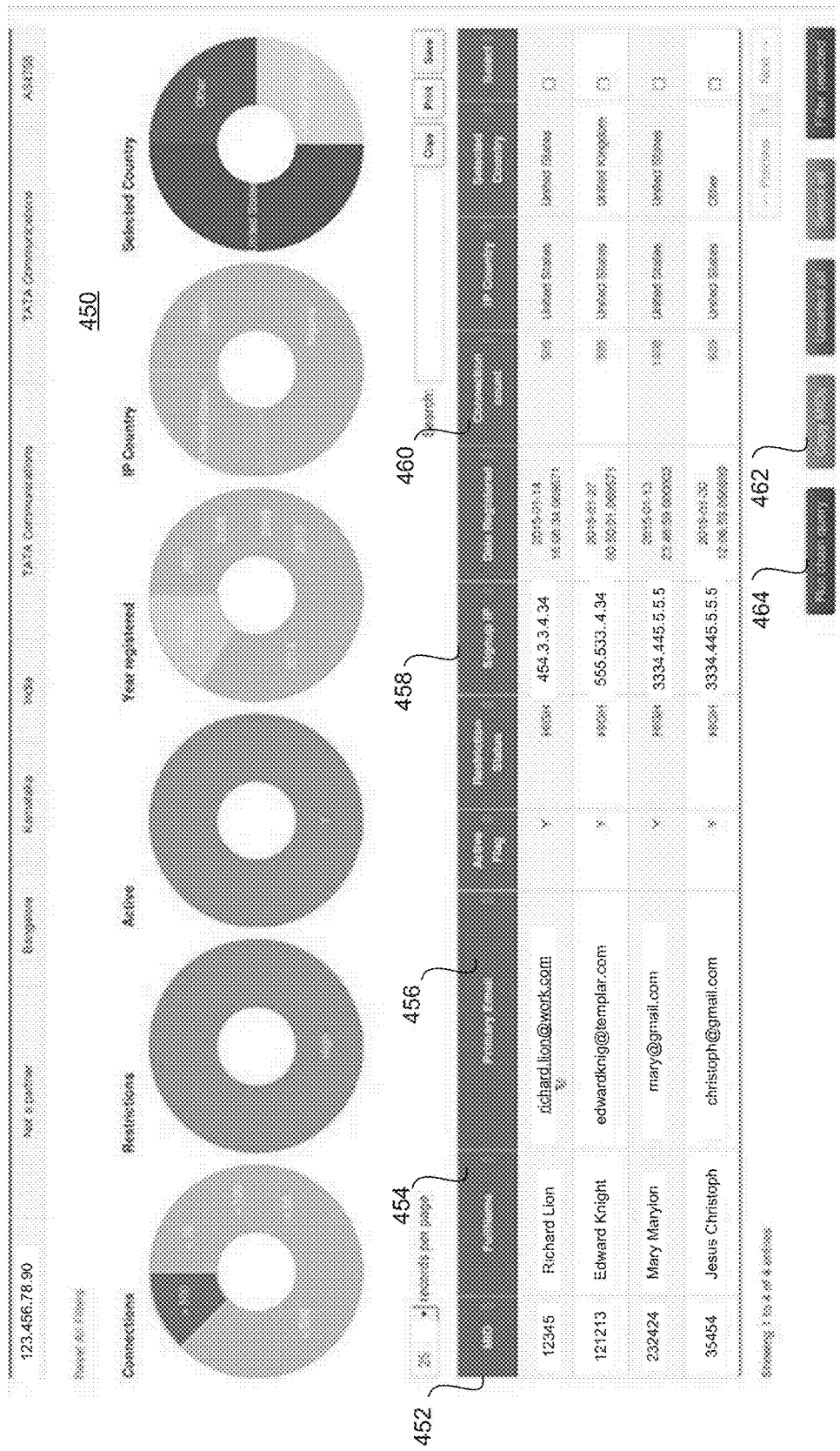

FIG. 4E depicts an example screen or screenshot 450 comprising presentation of a different set of user account information in accordance with selection of a different set of filtering elements. The table of user account information in each of FIGS. 4C-4E contains interactive elements (e.g., links), such as in each of columns 452-460 (e.g., MID, Full name, Primary email, Signup IP, and Connection count). FIG. 4E shows the user clicking on a particular email address to view additional information about the particular user account associated with the selected email address.

Figure 4F:

FIGS. 4F-4I depict an example presentation of IP address (es)-related information, such as the visualization data 412 in FIG. 4B, in conjunction with an interactive map. For instance, if the user actuated the map icon 421 in FIG. 4C, IP address(es)-related information can be provided in a map-centric environment such as shown in FIG. 4F. FIG. 4F depicts an example screen or screenshot 470 comprising a world map denoted with markers 472 at specific geographic locations corresponding to IP address(es) specified by the user. In the example screenshot 470, six different IP addresses are specified and marked.

Figure 4G:
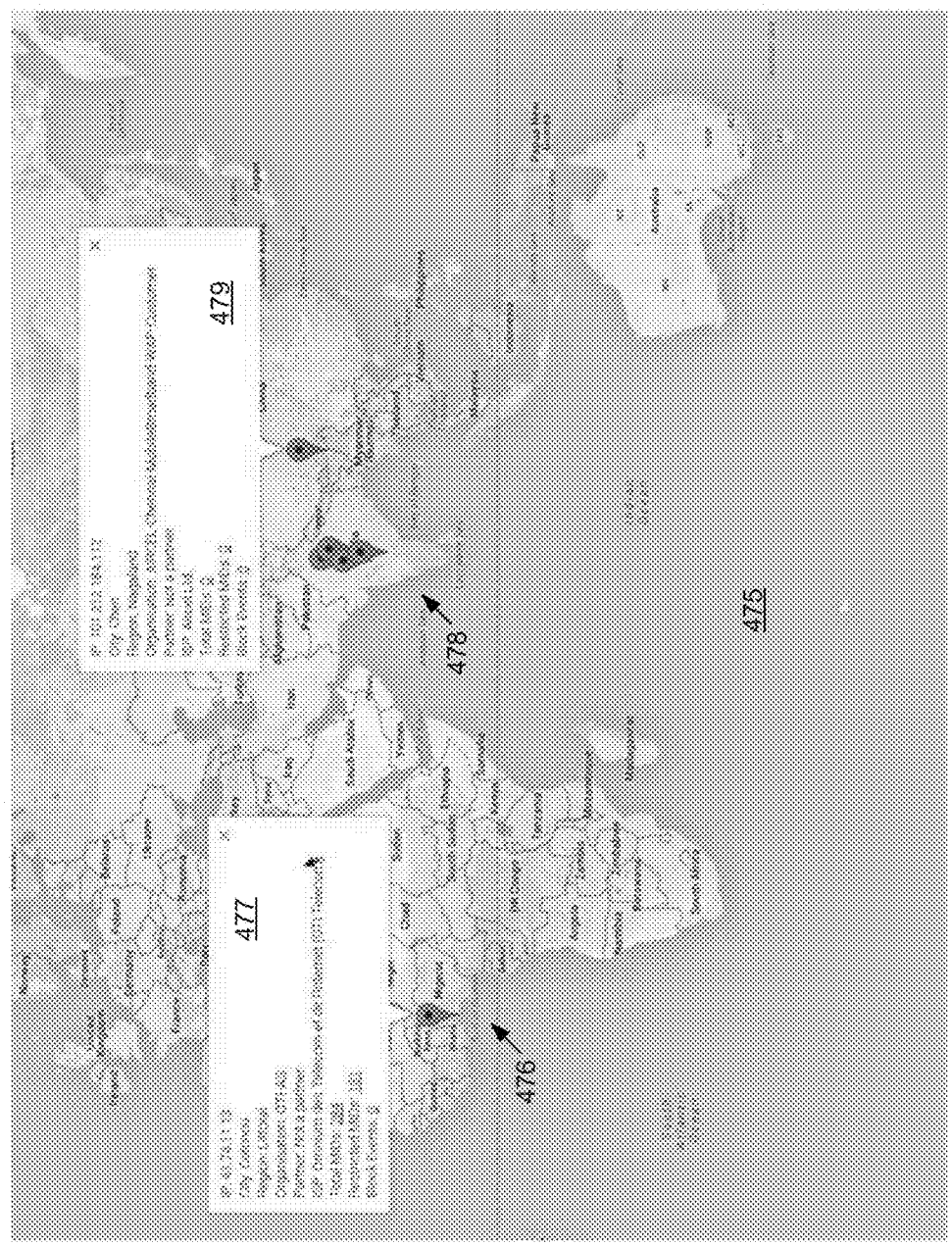

When the user expresses interest in (e.g., clicks on, hovers a mouse pointer over, touches, etc.) any of the markers 472, additional information associated with the particular marker 472 of interest is provided. FIG. 4G depicts an example screen or screenshot 475 showing a first additional information bubble 477 and a second additional information bubble 479 corresponding to respectively a first marker 476 of interest and a second marker 478 of interest from among the markers 472. Each of the first and second additional information bubbles 478 and 479 includes IP address-related information, such as included in the visualization data 412. IP address-related information may be similarly provided for any of the remaining markers 472.

Figure 4H:
Figure 4I:
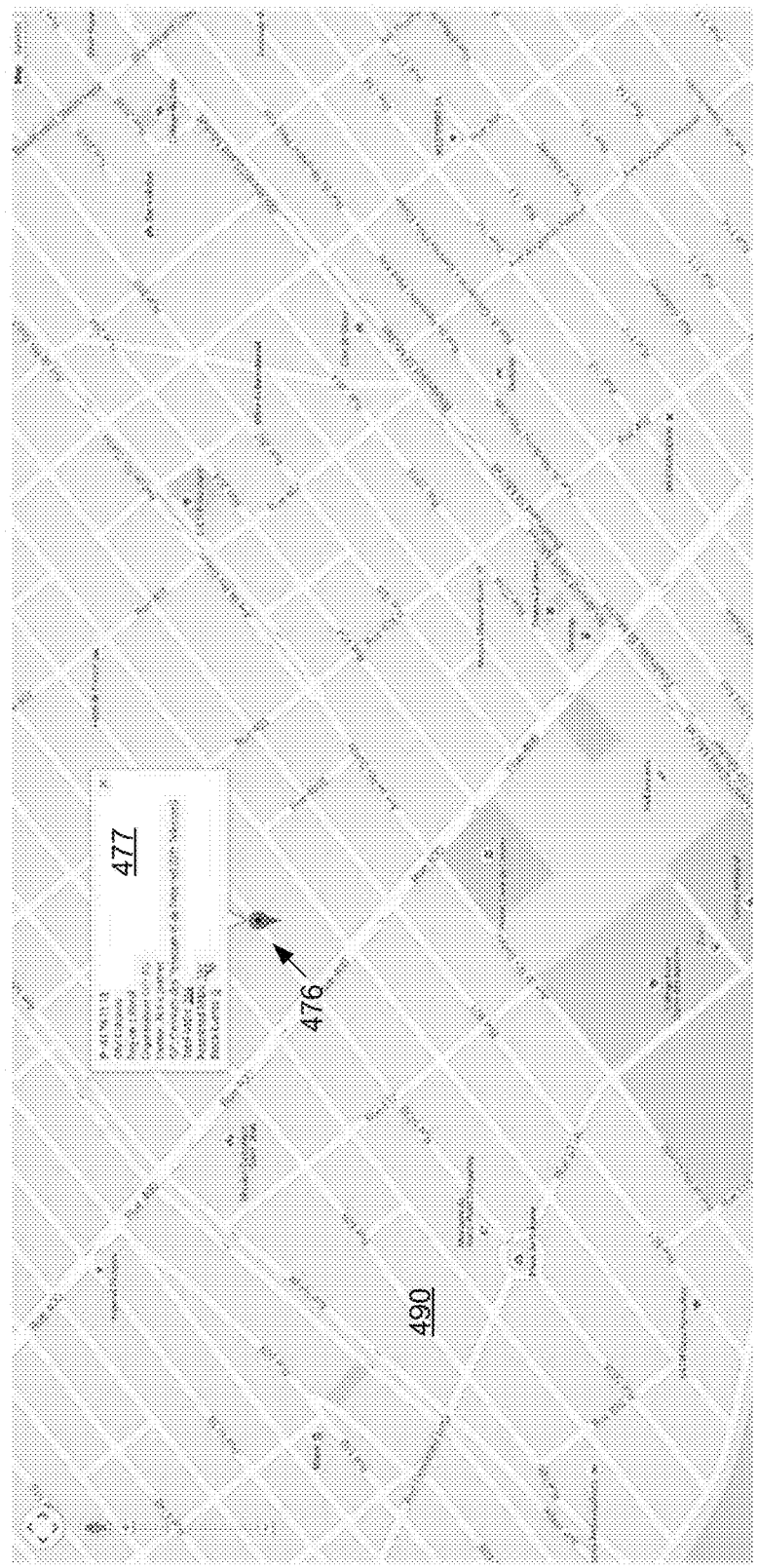

In addition to accessing IP address-related information as shown in FIG. 4G, the user may also interact with the map to view more details about the geographic location associated with a particular marker 472. For instance, the user can progressively zoom in or out of any portion of the map. FIGS. 4H-4I depict example screens or screenshots 480 and 490 showing progressively more details about the location associated with first marker 476. Note that even in screen 490 of FIG. 4I, a street level depiction of the location associated with first marker 476, the first additional information bubble 477 can be displayed to the user.

In this manner, the investigative visualization tool 104 facilitates comprehensive and easy access to a variety of information associated with an IP address to determine, investigate, and/or detect suspicious activity occurring on the online social network. For example, if an IP address already has a large percentage of associated user accounts that are blocked, restricted, or closed, then the remaining associated user accounts may also be engaging in unauthorized activity and one or more of those remaining user accounts may merit additional scrutiny or account status change. In some cases, the IP address itself may merit being blocked, restricted, or added to a black list. As another example, the attributes of an IP address (e.g., belonging to a partner or associated with a large number of user accounts) may require a more conservative security response so as not to negatively impact one or more user accounts associated with such IP address. In another example, if the geographic location and/or the surrounding environment associated with a particular IP address is an unlikely location from which an IP address should originate, the particular IP address may merit additional scrutiny.

Member Identifier Use Case

Figure 5:
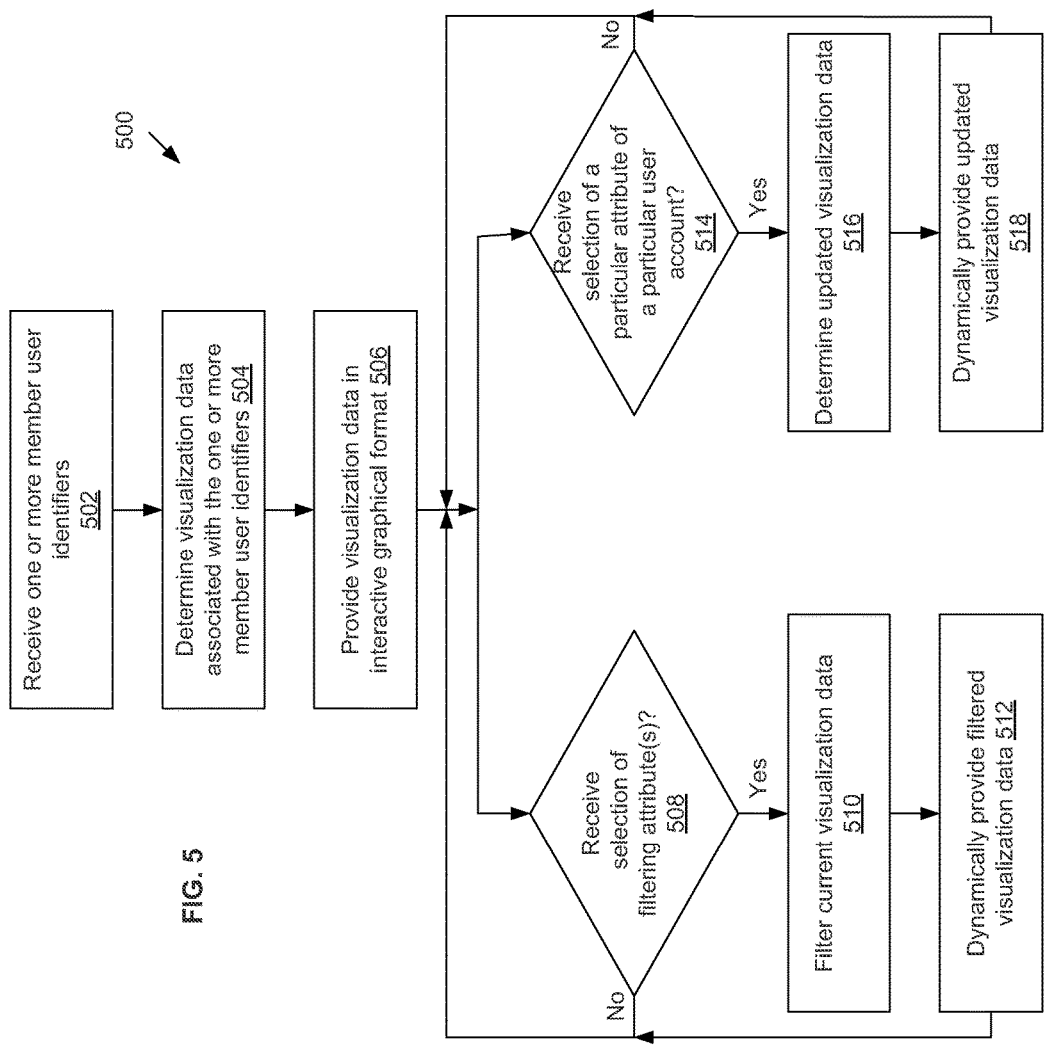
FIG. 5 illustrates an example flow for providing information in response to a member user identifier query, according to some embodiments.

FIG. 5 depicts an example flow 500 of the investigative visualization tool 104 that is responsive to receiving one or more member user identifiers as the input or query, according to some embodiments. FIGS. 6A-6H depict example screens or screenshots of information presented by the investigative visualization tool 104 in connection with the received one or more member user identifiers, according to some embodiments. FIG. 5 is described in detail below in conjunction with the components and data of FIG. 2 and the screenshots of FIGS. 6A-6H. In an embodiment, each of the processes described in connection with the functional blocks of FIG. 5 may be implemented using one or more computer programs, other software elements, and/or digital logic in any of a general-purpose computer or a special-purpose computer, while performing data retrieval, transformation and storage operations that involve interacting with and transforming the physical state of memory of the computer. Flow 500 depicts example techniques accessed by a specific user, such as an administrator, customer support personnel, or security team personnel of the online social network. The process of flow 500 can be repeated for each of multiple of such users at different points in time.

In block 502, the user interface component 200 receives an input or query from a user at the client 108. The input or query comprises one or more member user identifiers and, optionally, additional input or constraint, such as a date range. The member user identifier can be a MID number. In alternative embodiments, the input or query can comprise a member user's full name, email address, or other identifier of a member user or account instead of a MID number.

In response to the received input or query (one or more member user identifiers and possible additional input), the visualization determination component 202 determines or identifies visualization data associated with the received input or query in block 504. Visualization determination component 202 accesses and/or generates the visualization data using one or more of stores 212-218. Visualization data comprises the output or query result corresponding to the received input or query. Visualization data may also be referred to as visualization data set, displayed data set, or query results.

The visualization data comprises information about the user account(s) associated with the received member user identifier(s) (and additional input, if specified). User account (s) associated with the received member user identifier(s) include both first user account(s) that directly correspond to the received member user identifier(s) and second user account(s) that are deemed to be connected to the first user account(s) based on same browser identifier(s). The specific connections between the first and second user accounts are also specified. Typically, a single user account is mapped to a single member user. Thus, terms referring to a member user or a user account may be used interchangeably herein.

In an embodiment, the visualization data includes, but is not limited to, one, two, or more of the following: account restriction status information, account creation information, account access geographical information, account content accessed history information, account identifier, or account contact information.

Next in block 506, visualization determination component 202 in conjunction with the visualization component 204 configures and provides the visualization data for display on the client 108. In an embodiment, the visualization data is displayed in an interactive graphical format, comprising multiple graphical or visual elements, of which one or more of the elements may be user interactive (e.g., links, buttons, "active" icons, radio buttons, checkboxes, dropdown box, or the like).

Figure 6A:
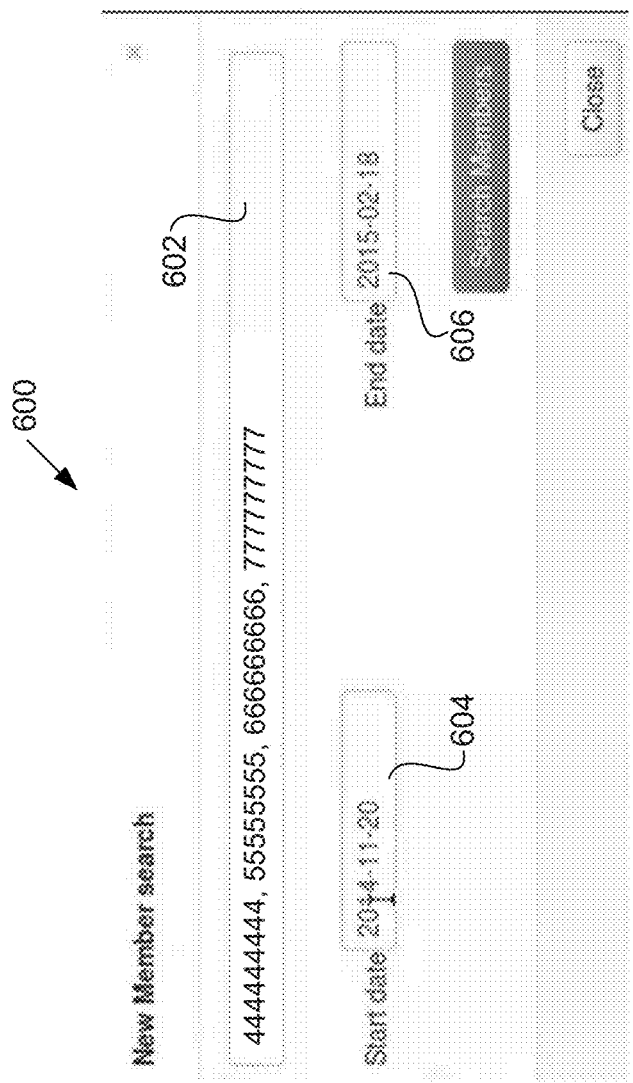
FIGS. 6A-6I illustrate example screens or screenshots of information presented in connection with the received one or more member user identifiers, according to some embodiments.

FIG. 6A depicts an example screen or screenshot 600 including a member user identifier field 602, a start date field 604, and an end date field 606. Screen 600 shows four MIDs numbers entered into the member user identifier field 602, Nov. 20, 2014 entered into the start date field 604, and Feb. 18, 2015 entered into the end date field 606. The MIDs numbers in the member user identifier field 602 can be entered by the user or carried over from a screen relating to the IP address use case described above. For example, in FIG. 4E, the user can check boxes in the "Select" column corresponding to desired user accounts, and click on a "Copy MIDs" button 462 to save and copy desired MIDs numbers for later use, such as inputs in the member user identifier field 602 in FIG. 6A. Alternatively, presentation of visualization data associated with one or more member user identifiers can be initiated by checking boxes in the "Select" column corresponding to desired user accounts in FIG. 4E, and clicking on a "Run chain query" button 464 in FIG. 4E.

Figure 6B:
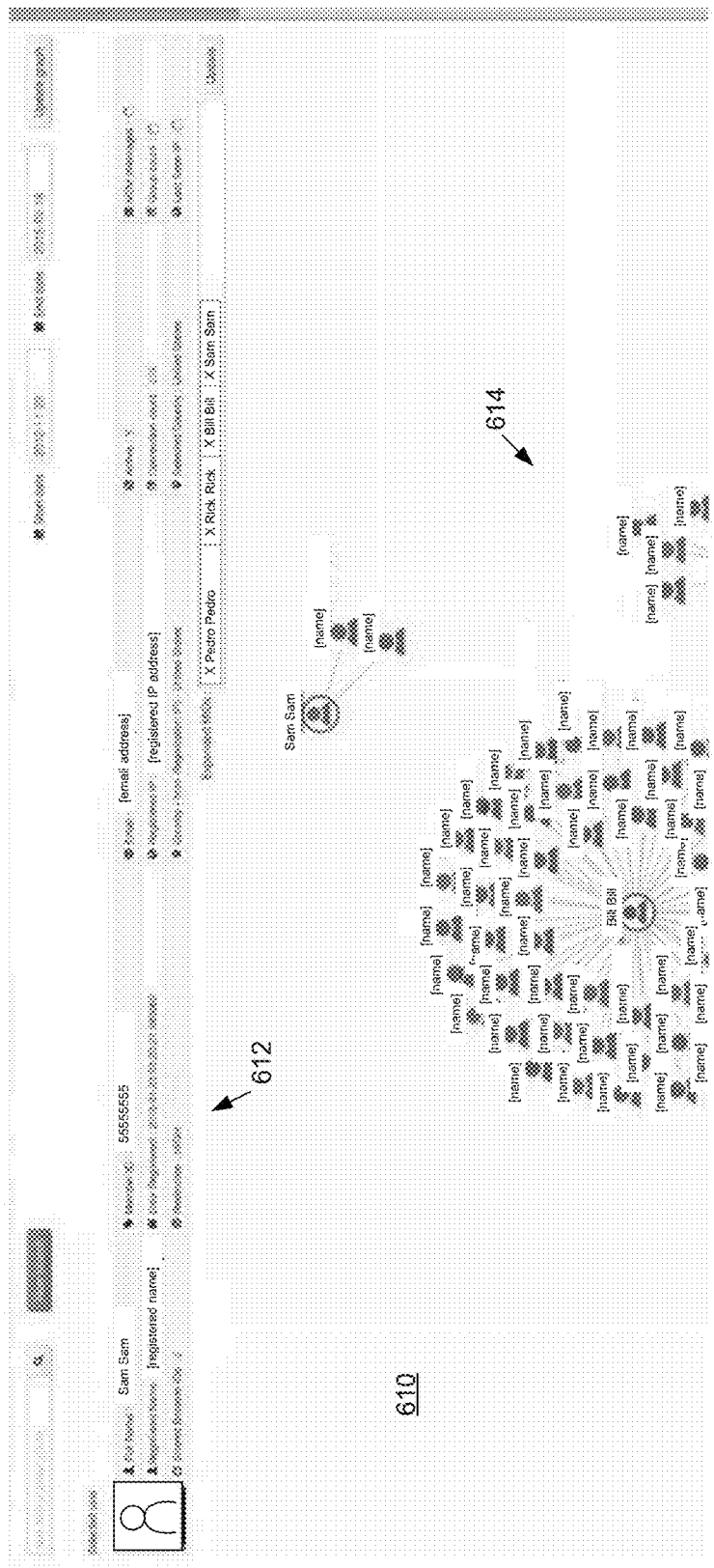
Figure 6C:
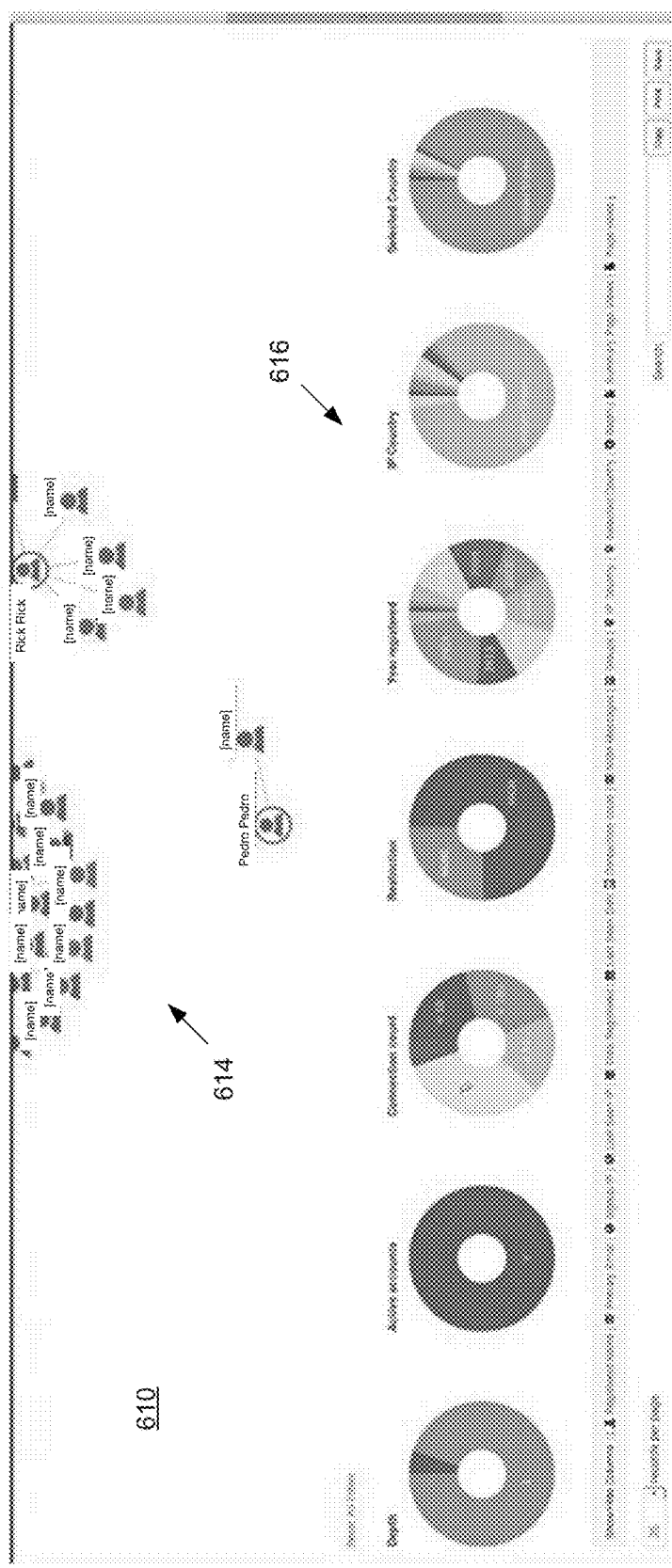
Figure 6D:
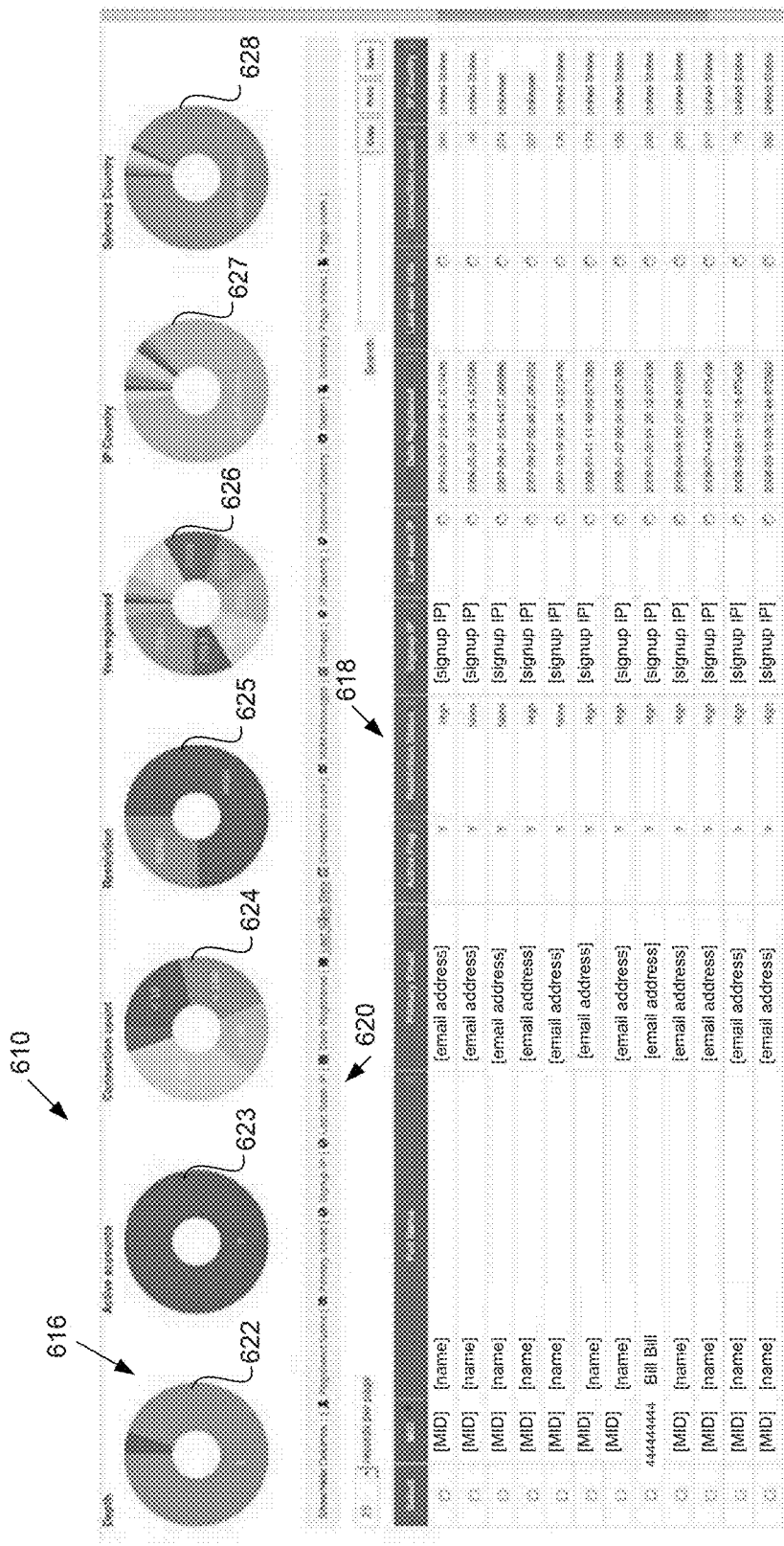

An example of query results corresponding to the received member user identifiers that are presented to the user are depicted in an example screen or screenshot 610 in FIGS. 6B-6D. Screen 610 comprises multiple sections including, but not limited to: a particular user account information section 612, a connection graph section 614, a filtering elements section 616, a user accounts information section 618, and an additional user accounts information selection section 620. The particular user account information section 612 comprises information about a particular user account from among multiple user accounts in the connection graph section 614. The particular user account can be selected by the user in the connection graph section 614. In an embodiment, the particular user account information section 612 is presented in a table format, although other formats may also be possible. The particular user account information section 612 includes, but is not limited, to the following information about the particular user account:

Member user image,
Full name,
Registered name,
Count of shared browser identifiers,
Member ID,
Account registration date,
Account restriction status,
Email address,
Registered IP address,
Country of registered IP address,
Whether the account is active or not,
Count of first degree connections,
Selected country,
Count of member-to-member messages,
Count of groups joined,
Last seen IP address, and/or
Other information about the particular user account.

The particular user account information section 612 may serve as an information "snapshot" of a particular member user.

The connection graph section 614 visually specifies the user accounts that were accessed from the same browser identifier, within the specified date range, as each of the respective received member user identifiers. Screen 610 illustrates four connection graphs (also referred to as circle spoke charts or spoke diagrams), one for each of the four member user identifiers received in block 502. In each of the connection graphs, an icon representative of a member user identifier received in block 502 is positioned in the center, denoted as a person icon inside a circle, with a full name or registered name associated with the member user identifier provided next to the circle. Radiating outward from the center, each user account that was also accessed using the same browser identifier as the user account in the center is denoted by a person icon with the associated member user's full name or registered name provided next to the person icon. A line or "spoke" between the center icon and each of the respective outer icons denotes the connection between each pair of user accounts.

Each of the person icons can additionally include an indicator to denote a user account restriction status. For example, a person icon may be in blue to denote a normal status (e.g., no restrictions), in red to denote a restriction status (also referred to as a blocked status), or in black to denote an account closed status. As another example, where there is more than one type of restriction status specified in the user accounts status store 216, each of the different types of restriction may be indicated within the connection graph. For instance, different types of restrictions may comprise a low, medium, or high restriction status. Or the different types of restrictions may comprise a no outgoing email restriction, no connection request restriction, or no change to contact information restriction.

In an embodiment, the user can move connection graphs within the screen 610 to reposition connections graphs relative to each other and/or to make it easier to view information within a particular connection graph. For example, the leftmost connection graph in FIG. 6B has a large number of "spokes," causing some of the names to overlap with each other. Repositioning the leftmost connection graph can alleviate the viewing issue associated therewith.

A browser identifier (also referred to as a web browser identifier) comprises a unique identifier known by the online social network and may be used as a proxy indicator of a unique device on which a particular user account was accessed. For example, a browser identifier may be a cookie stored at a particular device (e.g., client 112) from the online social network, or an identifier of a particular web browser running on a particular device from which the particular user account was accessed. Each time a user account is accessed from the particular device, the browser identifier information may be provided to the online social network. If another user account is also accessed from the same particular device (e.g., members of the same family may share a common computer), the same browser identifier information is also provided to the online social network. This use of the browser identifier serves a positive security function, in that if a given user account is mostly accessed in a first country and then accessed from a different second country—country information obtained from the IP addresses, if the same browser identifier is associated with access in both countries, then there is confidence that the access from the second country occurred on the same device and is likely an authorized access. If the browser identifier is removed from the particular device, then the next time the particular user account is accessed on the particular device, a different browser identifier is associated with the later access.

The filtering elements section 616 comprises, in an embodiment, multiple filtering elements represented as interactive pie charts, each pie chart having a plurality of interactive sections corresponding to data attributes on which the user account information in the user accounts information section 618 can be filtered. One or more of the pie chart sections can be selected to filter on respective one or more of the selected filtering attributes. The plurality of filtering elements comprises, but are not limited to, one or more of: a number of depth filtering element 622, active or inactive status of the user account filtering element 623, a connections count filtering element 624, a type of restrictions filtering element 625, a registration year of the user account filtering element 626, a country of the IP address used to register the user account filtering element 627, and a selected country of the user account filtering element 628. One or more of the filtering elements in screen 610 and one or more of the filtering elements 422 in FIG. 4C are the same or similar to each other.

The number of depth filtering element 622 relates to the number of expanded sets of user accounts from the originating/starting user account. That is, the number of connections/nodes from the originating/starting user account or the degree of separation from the originating/starting user account. For example, the originating/starting user account (e.g., administrator user specified) may be referred to as belonging to depth 0. The user accounts nodes that directly connect, radiate, or expand out from the originating/starting user account (e.g., those user accounts sharing the same browser identifier as the originating/starting user account) may be referred to as belonging to depth 1. If the administrator user actuates or indicates interest in one of the user accounts nodes belonging to depth 1, there exists a set of user accounts nodes that are directly connected to or expands out from the selected user accounts node belonging to depth 1. The latest set of user accounts nodes may be referred to as belonging to depth 2. Each successive expansion of user accounts set from the originating/starting user account may thus be assigned successive depth values. Hence, if a depth of one is specified (or set by default) for the number of depth filtering element 622, then only user accounts that are one connection or node from the originating/starting user account are presented, such as depicted in connection graph section 614 of FIG. 6B.

The user accounts information section 618 provides information about each of the user accounts represented in the connections graph section 614—user accounts corresponding to the received member user identifiers and the user accounts associated with the same browser identifier as any of the user accounts corresponding to the received member user identifiers. In an embodiment, the user account information is presented in table format, although other visual format may also be possible. The table columns are similar to those in the table of user account information 430 of FIG. 4C.

In an embodiment, the additional user accounts information selection section 620 permits additional and/or alternative user account information to be displayed than those currently shown in the user accounts information section 618. The section 620 comprises a plurality of types of user account information available for presentation in the table in section 618. The user can click on any of the available types to update the table in section 618 accordingly. For example, if the user clicks on the "M2M Messages" type in section 620, the table in section 618 is dynamically updated to include a "M2M Messages" column and provide a count of the member-to-member messages for each of the respective user account rows of the table.

Note that if a single member user identifier was entered in FIG. 6A instead of four member user identifiers, then FIGS. 6B-6D may display information about the user account associated with the specified member user identifier and the user accounts associated with the same browser identifier as the specified member user identifier. As such, only a single connection graph may be shown instead of four connection graphs and the user account information section 618 includes user account information associated with the specified member user identifier and the user accounts associated with the same browser identifier as the specified member user identifier.

Returning to FIG. 5, at a yes branch of block 508, user interface component 200 receives user selection of one or more filtering elements to filter the displayed visualization data. In an embodiment, the filtering operation is similar to that discussed above in connection with blocks 314-318 of FIG. 3. In block 510, the filtering component 206 performs filtering operations on the displayed visualization data in accordance with the user selected filtering element(s) in block 508. The visualization component 204 dynamically updates the presentation to provide filtered visualization data in block 512. Next, flow 500 returns to await a selection in either block 508 or 514. Likewise, if no filtering element is selected (i.e., no branch of block 508), then flow 500 proceeds to await the next input.

Similar to the discussion above for FIG. 4D, when the user selects one or more pie chart sections in the filtering elements section 616 of FIG. 6D, the user accounts information section 618 is dynamically updated to show only those user accounts that satisfies the selected one or more filtering elements. The person icons included in the connection graphs 614 of FIG. 6B are also dynamically updated to differentiate between user accounts that remain and those that have been filtered out from the original data set. For example, the two groups may be designated using different colors, shadings, or other indicia.

Returning to FIG. 5, at a yes branch of block 514, user interface component 200 receives user selection to view more information about a particular attribute of a particular user account (e.g., from within the table in the user accounts information section 618 of FIG. 6D or a query entry field). In block 516, the visualization determination component 202 determines updated visualization data in accordance with the received request in block 514. One or more of stores 212-218 are accessed to generate the updated visualization data. The updated visualization data comprises information about the particular attribute (e.g., first degree connections, page views, or summary of page views). The visualization component 204 dynamically provides the updated visualization data to the client 108 at block 518. Next, flow 500 returns to await a selection in either block 508 or 514. If no selection is made in block 514 (i.e., no branch of block 514), then flow 500 proceeds to await the next input. The updated visualization data comprises a variety of one or more graphical, visual, and/or interactive elements such as, but not limited to, tables, pie charts, bar graphs, scatter plots, connection graphs, links, input fields, and the like similar to those described above.

Figure 6E:

FIG. 6E depicts an example screen or screenshot 630 showing information about the first degree connections of a particular user account, in response to receiving a MID associated with the particular user account and, optionally, a date range inputted to query field(s) or window for first degree connections. Screen 630 includes a particular user account information section 632, filtering elements section 634, and a connections user accounts information section 636. The particular user account information section 632 includes information about the particular user account, such as a full name, MID, email address, registered name, a connections count, account registration date, registration IP address, account restrictions status, active or inactive account status, and registration country. Filtering elements section 634 includes multiple pie charts, each pie chart including one or more interactive sections that can be selected to filter the data provided in section 636. As shown filtering elements section 634, the data in section 636 can be filtered by a connected year, whether the connection is active or inactive, and/or whether or not the connection request was initiated by the particular user account (source MID). The connections user account information section 636 is provided in a table format, each first degree connection of the particular user account is shown in a row of the table. For each first degree connection, the following information is provided about the connection's user account: a last connected date, MID, name, active or inactive connection status, first connected date, connection modified date, and whether the connection was initiated by the particular user account.

Figure 6F:
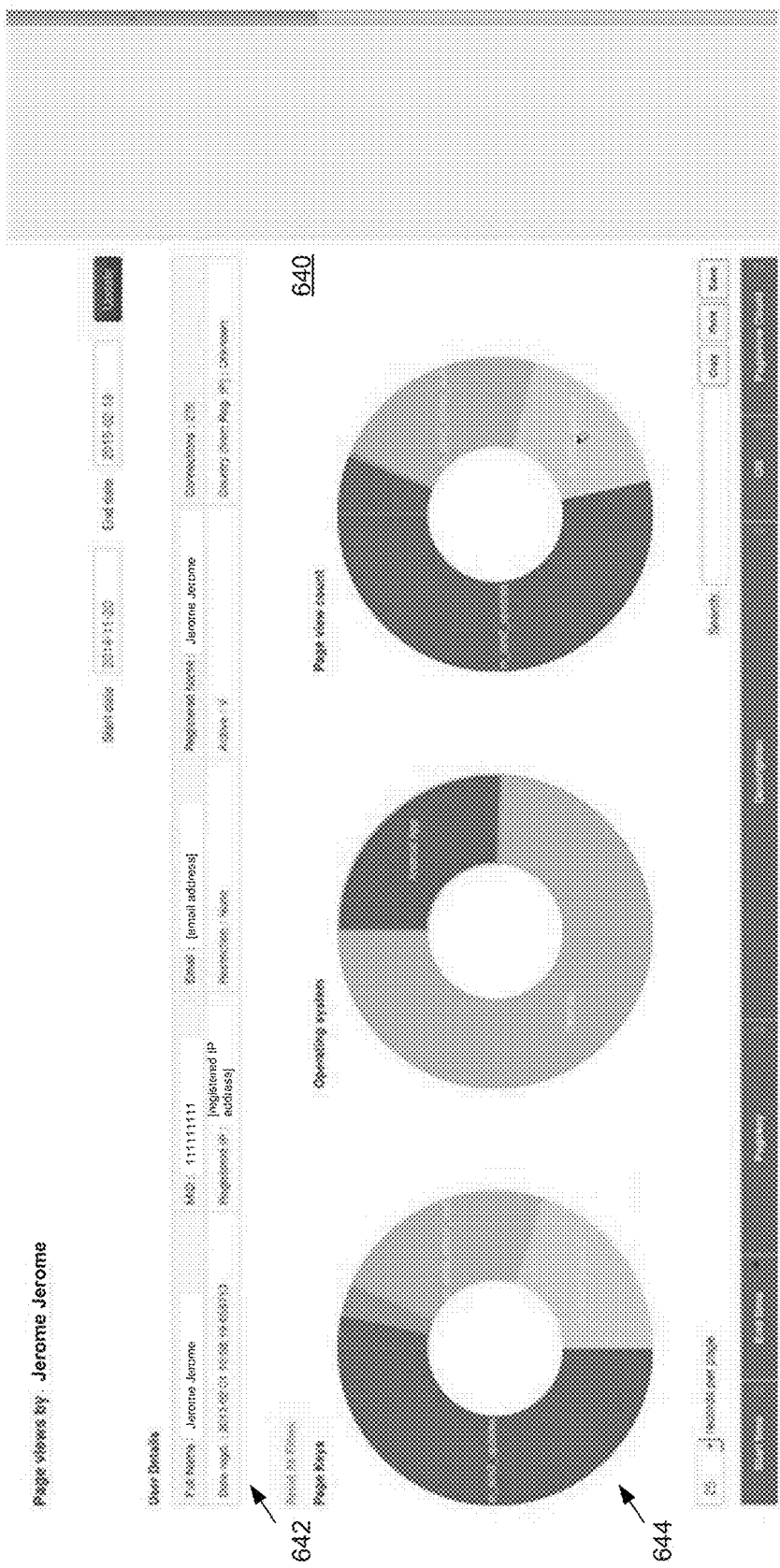
Figure 6G:
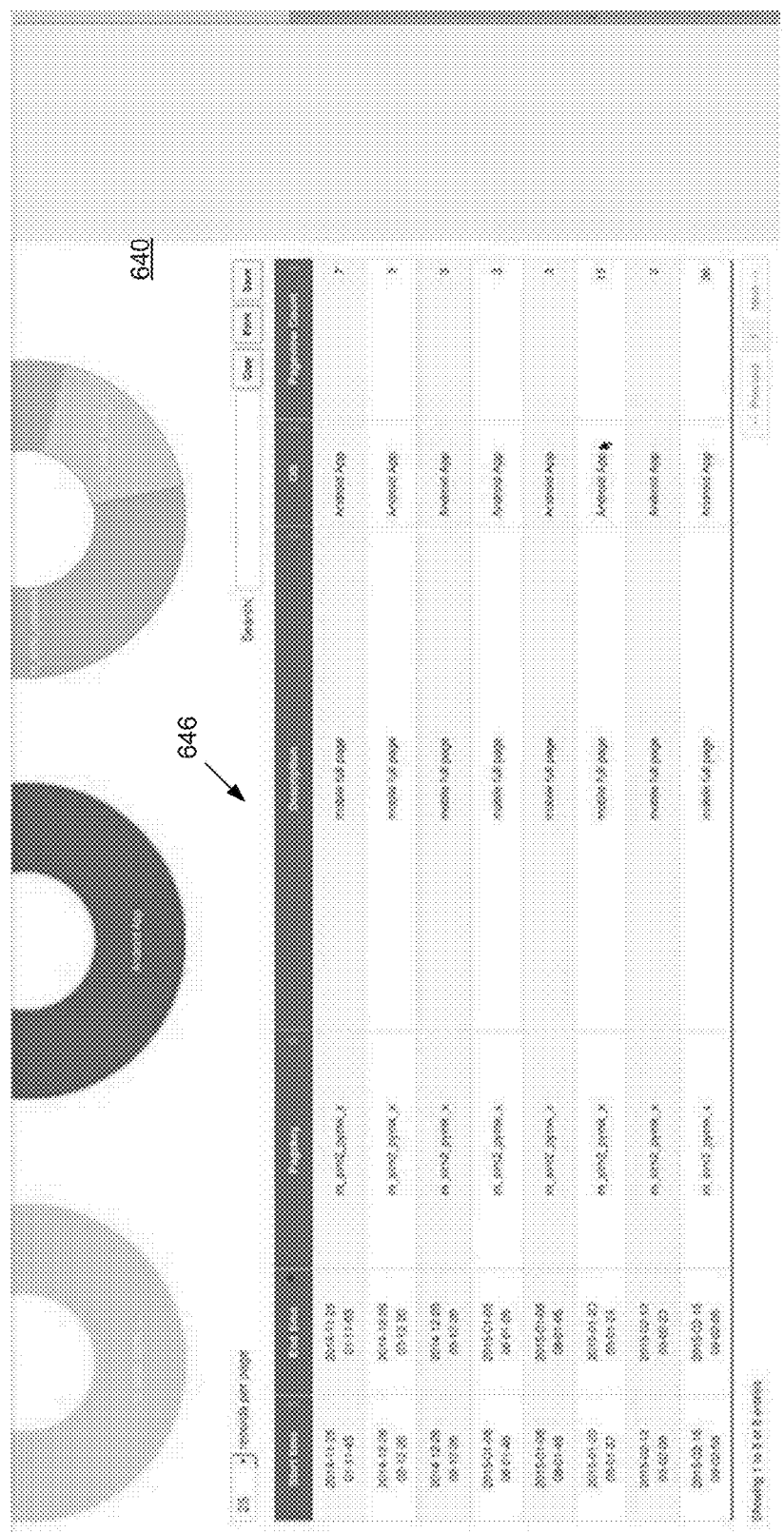

FIGS. 6F-6G depict an example screen or screenshot 640 showing information about the page views of a particular user account (e.g., MID 1111111 registered to "Jerome Jerome"). Screen 640 includes a particular user account information section 642, filtering elements section 644, and a page views information section 646. The particular user account information section 642 includes information about the particular user account similar to the particular user account information section 632 in FIG. 6E. The filtering elements section 644 includes multiple pie charts, each pie chart including one or more interactive sections that can be selected to filter the data provided in section 646. As shown in filtering elements section 644, the data in section 646 can be filtered by a page key or identifier, an operating system used to access a page, and/or a page view count. The page views information section 646 is provided in a table format, each page access associated with the particular user account is shown in a row of the table. If a date range is specified by the user, only the pages accessed during the specified date range are included in the table. For each page accessed, the following information about the page access or view is provided: a start time date stamp, an end time date stamp, a page key or identifier, a page description, an operating system used to access the page, and a page view count.

Figure 6H:
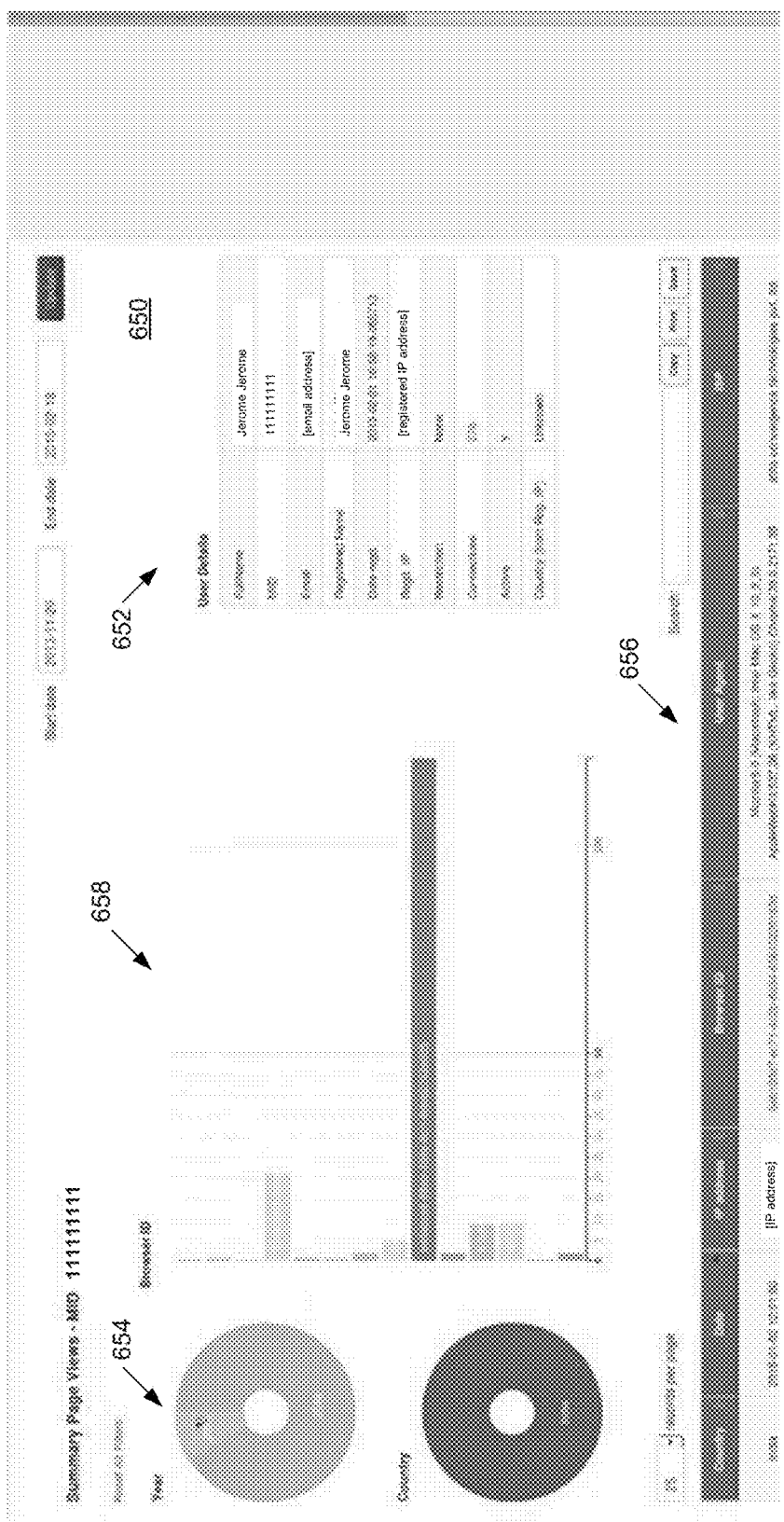

FIG. 6H depicts an example screen or screenshot 650 showing summary or aggregated information about page views of a particular user account (e.g., MID 11111111 registered to "Jerome Jerome"). Screen 650 includes a particular user account information section 652, filtering elements section 654, a session information section 656, and a browser identifier count information section 658. The particular user account information section 652 includes information about the particular user account similar to the particular user account information section 632 in FIG. 6E. Filtering elements 654 includes multiple pie charts, each pie chart including one or more interactive sections that can be selected to filter the data provided in sections 656 and/or 658. Data in sections 656 and/or 658 may be filtered by page viewed year and/or page viewed country. The session information section 656 is provided in a table format, each session on the online social network associated with the particular user account (during the specified date range) is shown in a row of the table. For each session, the following associated information is provided: country, date and time stamp, IP address, browser identifier, user agent, and ISP. The browser identifier count information section 658 is displayed in a bar graph, each bar representing a different browser identifier from each other and the length of the bar corresponding to a number of times the respective browser identifier was associated with a session by the particular user account (during the specified date range).

Figure 6I:
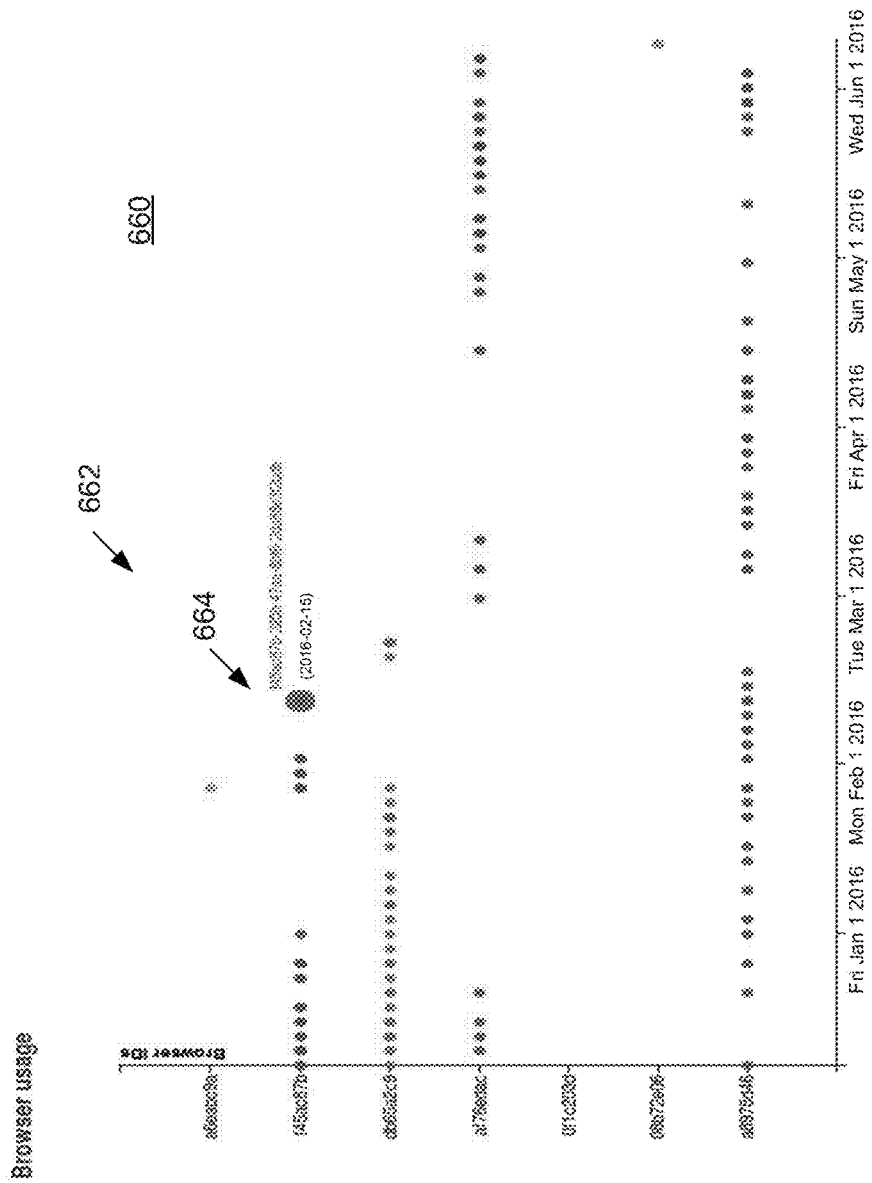

FIG. 6I depicts an example screen or screenshot 660 showing summary or aggregated information about page views of a particular user account. Screen 660 includes a browser identifier usage information section 662, which shows when and how often a particular browser (as represented by a unique browser identifier) was used to access the particular user account on the online social network. In an embodiment, section 662 comprises a scatter plot graph with the horizontal axis representing dates or time and the vertical axis representing browser identifiers. The date range covered in section 662 corresponds to a date range specified by the user or may be a default date range, if no date range is specified. If the user clicks on, hovers over, or otherwise indicates interest in a particular scatter point, such as scatter point 664, then additional information associated with such scatter point may be presented. As shown in screen 660, the full browser identifier and exact date corresponding to the scatter point 664 are displayed.

Information about a variety of other attributes may also be selected for further review. In some embodiments, information about a combination of two or more particular attributes of a particular user account may be provided instead of a single particular attribute as described in connection with FIGS. 6E-6I.

Figure 7A:
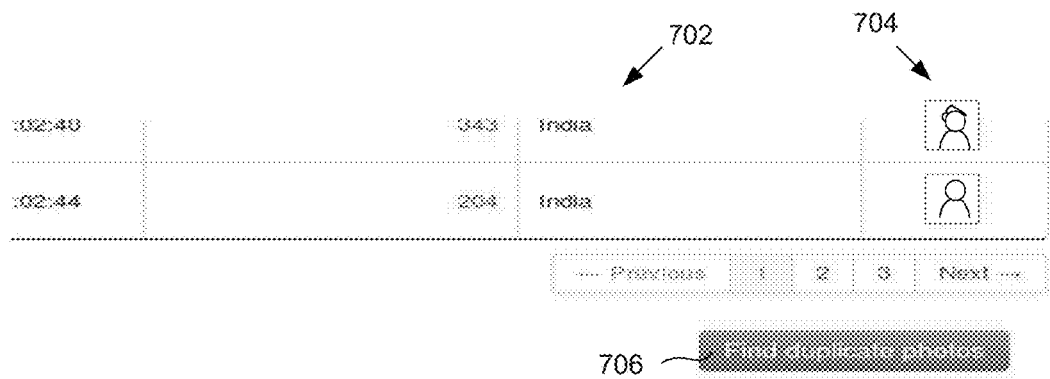
FIGS. 7A-7C illustrate example screens or screenshots of information presented in connection with the received one or more IP addresses, according to some embodiments.

In alternative embodiments, the user accounts information section 618 in FIGS. 6B-6D can include alternative and/or additional columns and associated functionalities. For example, FIG. 7A depicts an example screenshot or screen of a portion of a user accounts information section 702 (e.g., lower right corner portion of a user accounts information section) that includes a column 704 that displays a thumbnail of an image or photo associated with respective user accounts listed in the section. The image or photo may have been provided by and/or show the member user associated with a user account.

When a user (e.g., administrator user) actuates a "Find duplicate photos" button 706, visualization determination component 202 identifies duplicative (or near duplicative) images/photos from among the images/photos associated with user accounts listed in section 702. Duplication identification may comprise performing facial recognition, image decomposition, comparisons between images/photos, and/or other image processing in order to determine the content of each of the images/photos of interest and to compare the images/photos of interest with each other to determine duplication or identicality among the images/photos of interest.

Figure 7B:
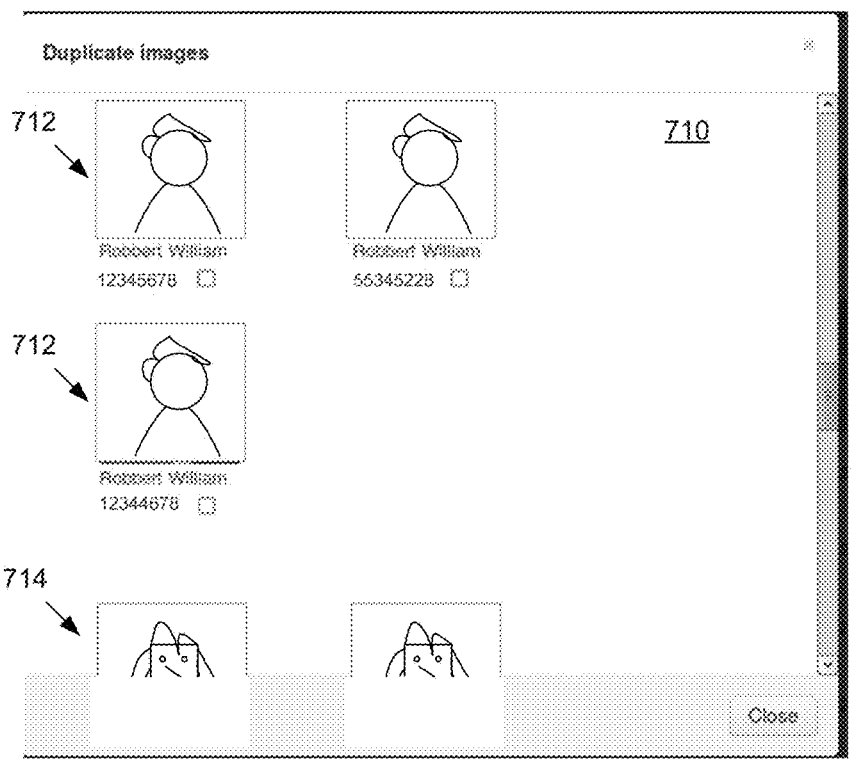
Figure 7C:
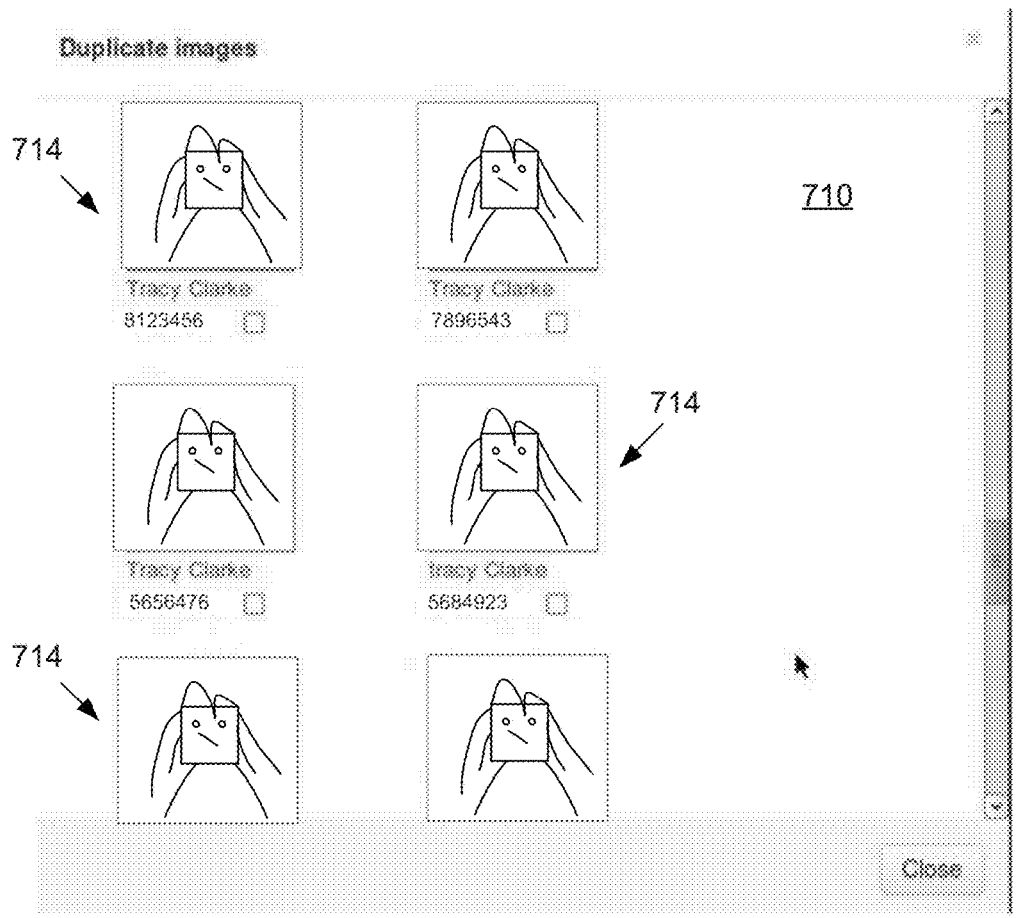

Duplication among the images/photos is presented by the visualization component 204, as depicted in an example screenshot or screen 710 in FIGS. 7B-7C. Images/photos deemed to be duplicative or identical to each other are grouped and displayed together, such as in a first group 712 and a second group 714. For each image/photo in the first and second groups 712 and 714, at least the image/photo, user name, and MID may be displayed. In some embodiments, an indicator or user input icon may also be included with each image/photo (e.g., a checkbox) in order for the user to confirm duplication, to notate duplications in the user accounts list, and/or to request that duplicative user accounts be removed from the user accounts list.

In FIGS. 7B-7C, three different user accounts are associated with the same image/photo (first group 712) and at least six different user accounts are associated with the same image/photo (second group 714). Use of the same image/photo or same person depicted in the images/photos across multiple user accounts supports a conclusion that the user actually associated with those user accounts is the same person.

In some embodiments, the investigative visualization tool 104 may include additional functionalities such as a tracking feature or account status change feature. The tracking feature may comprise the user interface component 200 providing user interface elements to receive one or more tracking conditions or characteristics such as, but not limited to, a particular user account, a particular IP address, a particular threshold, any other particular activity on the online social network, or a combination thereof. Then the investigative visualization tool 104 may automatically track the specified conditions and automatically provide a notification to the user if or when the specified conditions are met. The account status change feature may comprise additional user interface elements provided by the user interface component 200 to facilitate changing the status of one or more user accounts. The user may enter a member user identifier or other unique identifier for a user account and the desired status change. The user may enter an IP address and a desired status change and, as a result, all user accounts associated with the IP address (or a subset of user accounts, associated with the IP address, that satisfy one or more criteria) will be associated with the desired status change. The user accounts status store 216 is updated with the status change.

In this manner, the investigative visualization tool 104 facilitates comprehensive and easy access to a variety of information associated with user account(s) to determine, investigate, and/or detect suspicious activity. By analyzing user account activity over time or based on other attribute, patterns of usage may be discerned, which in turn, permits distinguishing between normal usage and suspicious usage and/or positive security indicators. For example, if a large number of user accounts are registered within a relatively same time period, from a same place, and the email addresses for the respective newly registered user accounts are similar to each other (e.g., john1@yahoo.com, john2@yahoo.com, john3@yahoo.com), such activity is indicative of a single person or entity creating user accounts potentially for unauthorized purposes. There would be no normal reason for a person to create multiple user accounts within a relatively same time period. As another example, if a user account has a large number of first degree connections and a significant number of connection requests are rejected by recipient member users, then this may be an indicator that other member users found this user account to be suspicious.

As still another example, even if a user account is accessed from a different geographical location than from before, if the same browser identifier is used for both geographical locations, then the access at the new geographical location is likely to be made by the actual or same member user of the user account rather than the user account taken over by an unauthorized person. The member user may be at the new geographical location for work or leisure and is using his/her same device to access the user account. As another example, if a member user is unable to log into his/her user account, then he/she may contact the online social network's customer support team. The customer support team, in turn, may use the investigative visualization tool 104 by querying the member user's account and reviewing the account information to see why the account is inaccessible. The customer support team may find, for example, that the account is closed due to certain detected activity or that it is temporarily restricted until the member user satisfies a certain security condition to remove the restriction.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
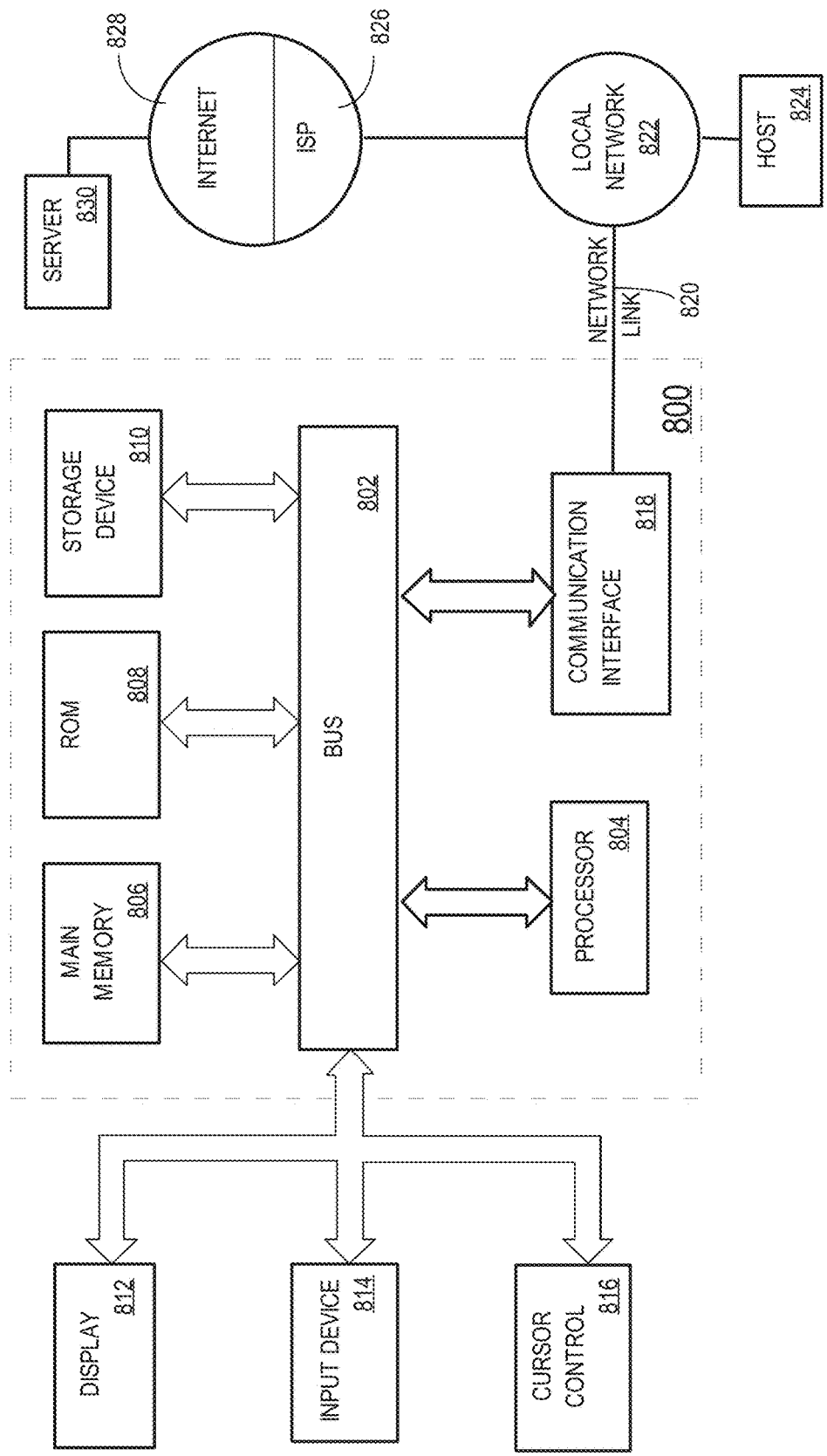
FIG. 8 illustrates a block diagram of an example computer system upon which embodiments of the present disclosure may be implemented.

For example, FIG. 8 is a block diagram that illustrates a computer system 800 upon which embodiments of the present disclosure may be implemented. Computer system 800 may be the server 102, database 106, client 108, and/or clients 120. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT) or liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computerized method, comprising:
for each user account in a set of user accounts, storing address data that indicates one or more Internet Protocol (IP) addresses that a user used to access said each user account;
after storing the address data, receiving a particular IP address;
in response to receiving the particular IP address and based on the address data, identifying a plurality of user accounts, in the set of user accounts in an online social network, that are associated with the particular IP address;
wherein a user of each user account in the plurality of user accounts accessed said each user account using the particular IP address;
for the plurality of user accounts, providing a plurality of interactive graphical elements that depict dynamically visualized information about the plurality of user accounts;
wherein the dynamically visualized information includes, for each user account of the plurality of user accounts, at least the same two or more of: one or more electronic mail addresses associated with a user account, a user account activity status, a user account restriction status, a registration IP address associated with user account registration, a time date stamp associated with the user account registration, a connections count that indicates a number or number range of connections in a social network, or a geographical location associated with the user account registration, wherein a plurality of different user account restriction statuses are displayed as being associated with the particular IP address if the dynamically visualized information includes the user account restriction status, wherein at least one of the displayed registration IP addresses is different than the particular IP address if the dynamically visualized information includes the registration IP address for said each user account;

wherein the method is performed by one or more computing devices.

2. The method of claim 1, further comprising:
receiving, from a first user, an input to change the user account restriction status of a particular user account, in the plurality of user accounts, that is associated with a second user that is different than the first user;
updating the user account restriction status of the particular user account in accordance with the input.

3. The method of claim 1, wherein the plurality of interactive graphical elements include information about the particular IP address.

4. The method of claim 3, wherein the information about the particular IP address includes at least two of: a count of user accounts associated with the particular IP address, a count of restricted status user accounts associated with the particular IP address, a count of blocked events, a partner associated with the particular IP address, geographical location information about the partner, an organization associated the particular IP address, a service provider associated with the particular IP address, or an autonomous system number (ASN) associated with the particular IP address.

5. The method of claim 3, wherein the information about the particular IP address includes at least one of: a count of restricted status user accounts associated with the particular IP address or a count of blocked events associated with the particular IP address.

6. The method of claim 1, further comprising:
in response to receiving a selection of a particular user account from among the plurality of user accounts depicted in the dynamically visualized information, determining one or more other user accounts connected to the particular user account based on a same web browser identifier associated with each of the particular user account and the one or more other user accounts;
causing to be displayed a first graphical element visually depicting a connection between the particular user account to each of the respective one or more other user accounts.

7. The method of claim 6, wherein the web browser comprises a cookie or an identifier of a particular web browser running on a particular device from which each of the particular user account and the one or more other user accounts was accessed.

8. The method of claim 6, further comprising:
causing to be displayed a second graphical element visually depicting account information and account access information of the particular user account and the one or more other user accounts;
wherein the second graphical element depicts at least two or more of: account restriction status information, account creation information, account access geographical information, account content accessed history information, account identifier, or account contact information.

9. The method of claim 8, wherein the second graphical element includes a first data type filtering element and a second data type filtering element.

10. The method of claim 9, further comprising:
receiving selection of the first data type filtering element;
in response to receiving selection of the first data type filtering element, automatically filtering the account information and the account access information of the particular user account and the one or more other user accounts currently displayed to determine data comprising the first data type;
dynamically updating the first graphical element and the second graphical element to highlight the data comprising the first data type or exclude data not comprising the first data type.

11. A system comprising:
one or more databases including a set of user accounts of an online social network, wherein each user account of the set of user accounts is associated with a member;
one or more processors in communication with the one or more databases;
one or more storage media storing instructions which, when executed by the one or more processors, cause:
for each user account in a set of user accounts, storing address data that indicates one or more Internet Protocol (IP) addresses that a user used to access said each user account;
after storing the address data, receiving a particular IP address;
in response to receiving the particular IP address and based on the address data, identifying a plurality of user accounts, in the set of user accounts in an online social network, that are associated with the particular IP address;
wherein a user of each user account in the plurality of user accounts accessed said each user account using the particular IP address;
for the plurality of user accounts, providing a plurality of interactive graphical elements that depict dynamically visualized information about the plurality of user accounts,
wherein the dynamically visualized information includes, for each of the plurality of user accounts, at least the same two or more of: one or more user account identifiers, one or more electronic mail addresses associated with a user account, a user account activity status, a user account restriction status, a registration IP address associated with user account registration, a time date stamp associated with the user account registration, a connections count that indicates a number or number range of connections in a social network, or a geographical location associated with the user account registration, wherein a plurality of different user account restriction statuses are displayed as being associated with the particular IP address if the dynamically visualized information includes the user account restriction status, wherein at least one of the displayed registration IP addresses is different than the particular IP address if the dynamically visualized information includes the registration IP address for said each user account.

12. The system of claim 11, wherein the one or more processors receiving, from a first user, an input to change the user account restriction status of a particular user account, in the one or more user accounts, that is associated with a second user that is different than the first user, updating the user account restriction status of the particular user account in accordance with the input.

13. The system of claim 11, wherein the plurality of interactive graphical elements include information about the particular IP address.

14. The system of claim 13, wherein the information about the particular IP address includes at least one of: a count of user accounts associated with the particular IP address, a count of restricted status user accounts associated with the particular IP address, a count of blocked events, a partner associated with the particular IP address, geographical location information about the partner, an organization associated the particular IP address, a service provider associated with the particular IP address, or an autonomous system number (ASN) associated with the particular IP address.

15. The system of claim 11, wherein the instructions, when executed by the one or more processors, further cause:

in response to receiving a selection of a particular user account from among the one or more user accounts depicted in the dynamically visualized information, determining one or more other user accounts connected to the particular user account based on a same web browser identifier associated with each of the particular user account and the one or more other user accounts, causing to be displayed a first graphical element visually depicting a connection between the particular user account to each of the respective one or more other user accounts.

16. The system of claim 15, wherein the web browser comprises a cookie or an identifier of a particular web browser running on a particular device from which each of the particular user account and the one or more other user accounts was accessed.

17. The system of claim 15, wherein the instructions, when executed by the one or more processors, further cause:

causing to be displayed a second graphical element visually depicting account information and account access information of the particular user account and the one or more other user accounts, wherein the second graphical element depicts at least two or more of: account restriction status information, account creation information, account access geographical information, account content accessed history information, account identifier, or account contact information.

18. The system of claim 17, wherein the second graphical element includes a first data type filtering element and a second data type filtering element.

19. The system of claim 18, wherein the instructions, when executed by the one or more processors, further cause:

receiving selection of the first data type filtering element, in response to receiving selection of the first data type filtering element, automatically filtering the account information and the account access information of the particular user account and the one or more other user accounts currently displayed to determine data comprising the first data type, dynamically updating the first graphical element and the second graphical element to highlight the data comprising the first data type or exclude data not comprising the first data type.

* * * * *